United States Patent
Shibata et al.

(10) Patent No.: US 8,806,928 B2
(45) Date of Patent: Aug. 19, 2014

(54) CATALYST DETERIORATION DETECTION APPARATUS AND CATALYST DETERIORATION DETECTION METHOD FOR INTERNAL COMBUSTION ENGINE

(75) Inventors: Daisuke Shibata, Numazu (JP); Hiroshi Sawada, Gotenba (JP); Toru Kidokoro, Hadano (JP); Akihiko Itakura, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/695,372

(22) PCT Filed: Apr. 30, 2010

(86) PCT No.: PCT/JP2010/057667
§ 371 (c)(1),
(2), (4) Date: Dec. 14, 2012

(87) PCT Pub. No.: WO2011/135710
PCT Pub. Date: Nov. 3, 2011

(65) Prior Publication Data
US 2013/0098146 A1    Apr. 25, 2013

(51) Int. Cl.
*G01M 15/10*    (2006.01)
(52) U.S. Cl.
USPC .................................................. 73/114.75
(58) Field of Classification Search
USPC .................................................... 73/114.75
See application file for complete search history.

(56) References Cited

U.S. PATENT DOCUMENTS

| | | | |
|---|---|---|---|
| 5,649,420 A * | 7/1997 | Mukaihira et al. | 60/274 |
| 6,877,366 B2 * | 4/2005 | Rabl | 73/114.75 |
| 7,021,044 B2 * | 4/2006 | Mukaihara et al. | 60/277 |
| 7,162,860 B2 * | 1/2007 | Shirakawa et al. | 60/277 |
| 7,707,821 B1 * | 5/2010 | Legare | 60/277 |

FOREIGN PATENT DOCUMENTS

| | | |
|---|---|---|
| JP | 2001-123824 A | 5/2001 |
| JP | 2004-353606 A | 12/2004 |
| JP | 2005-307745 A | 11/2005 |
| JP | 2007-327475 A | 12/2007 |
| JP | 2008-128170 A | 6/2008 |
| JP | 2009-156049 A | 7/2009 |
| JP | 2009-197735 A | 9/2009 |

* cited by examiner

*Primary Examiner* — Freddie Kirkland, III
(74) *Attorney, Agent, or Firm* — Gifford, Krass, Sprinkle, Anderson & Citkowski, P.C.

(57) ABSTRACT

Provision is made for a catalyst that is arranged in an exhaust passage of an internal combustion engine and has an oxidation function, downstream side temperature detection means that detects the temperature of an exhaust gas at a downstream side from the catalyst, and addition means that adds a reducing agent into the exhaust gas from an upstream side from the catalyst, wherein there are also provided correlation value calculation means that calculates a correlation value which is correlated with an amount of change of the temperature detected by the downstream side temperature detection means when the reducing agent is added by the addition means and when a transient operation of the internal combustion engine is carried out, and determination means that determines a deterioration of the catalyst by making a comparison between the correlation value and a threshold value which indicates the deterioration of the catalyst.

14 Claims, 14 Drawing Sheets

CATALYST DETERIORATION DETECTION APPARATUS AND CATALYST DETERIORATION DETECTION METHOD FOR INTERNAL COMBUSTION ENGINE

TECHNICAL FIELD

The present invention relates to a catalyst deterioration detection apparatus and a catalyst deterioration detection method for an internal combustion engine.

BACKGROUND ART

There has been known a technique in which the degradation of an oxidation catalyst arranged upstream of a particulate filter for trapping particulate matter (PM) in an exhaust gas is determined based on a difference between the temperature of the exhaust gas flowing into the oxidation catalyst and the temperature of the exhaust gas flowing out of the oxidation catalyst after a predetermined period of time has elapsed from the start of supply of unburnt fuel for regenerating the filter (see, for example, a first patent document).

However, the deterioration of a catalyst tends to progress earlier at a more upstream side thereof. That is, the deterioration of the catalyst progresses from an upstream side portion of the catalyst toward a downstream side portion thereof. Here, when the extent of the deterioration of the catalyst is still low, the temperature of the exhaust gas at the downstream side from the catalyst may become higher, as compared with the catalyst which has not deteriorated.

Here, with the catalyst which has not deteriorated, unburnt fuel reacts and generates heat at the upstream side portion of the catalyst. Then, this heat flows toward the downstream side together with the exhaust gas, so that the heat is provided to the downstream side portion of the catalyst. That is, due to the reaction of the unburnt fuel in the upstream side portion of the catalyst, heat is provided to a wide range of the catalyst. For this reason, a lot of heat is given to the catalyst. As a result of this, the temperature of the catalyst as a whole goes up, and at the same time, the temperature of the exhaust gas flowing out of the catalyst becomes low.

On the other hand, in cases where the extent of the deterioration of the catalyst is low, unburnt fuel mainly reacts in the downstream side portion thereof. This reaction heat provides heat to the downstream side portion of the catalyst. However, the heat is generated in the downstream side from the catalyst, so there is a small amount of heat given to the upstream side portion of the catalyst. As a result, the heat carried by the exhaust gas flowing out of the catalyst increases more, as compared with the catalyst which has not deteriorated, and hence, the temperature of the exhaust gas at the downstream side form the catalyst becomes temporarily high. That is, in cases where the catalyst has deteriorated to some extent, the temperature of the exhaust gas at the downstream side from the catalyst may become high. Then, as the deterioration of the catalyst progresses further, unburnt fuel becomes difficult to react in the downstream side portion of the catalyst, so the temperature of the exhaust gas at the downstream side from the catalyst becomes lower, as compared with the catalyst which has not deteriorated.

Thus, in cases where the catalyst has deteriorated, the temperature of the exhaust gas at the downstream side from the catalyst may become high or low. As a result, if the deterioration of the catalyst is determined based on a difference between the temperature of the exhaust gas at the upstream side from the catalyst and the temperature thereof at the downstream side from the catalyst, as in the past, there will be a fear that the accuracy of the determination may become low.

In addition, in the past, the determination of deterioration of the catalyst has been carried out during the steady state operation of an internal combustion engine, but at the time of the steady state operation, there is not so much difference in the amount of reaction of the unburnt fuel between a catalyst of which the extent of the deterioration is low and a catalyst which has not deteriorated. For this reason, if the deterioration determination of the catalyst is going to be carried out at the time of a steady state operation, it has to be carried out at the time of a limited operating state in which an appreciable or obvious difference appears in the amount of reaction of unburnt fuel. As a result, the opportunity for the deterioration determination of the catalyst decreases, so the deterioration determination of the catalyst takes much time.

PRIOR ART REFERENCES

Patent Documents

[First Patent Document] Japanese patent application laid-open No. 2008-128170
[Second Patent Document] Japanese patent application laid-open No. 2004-353606
[Third Patent Document] Japanese patent application laid-open No. 2009-156049
[Fourth Patent Document] Japanese patent application laid-open No. 2005-307745
[Fifth Patent Document] Japanese patent application laid-open No. 2007-327475

SUMMARY OF THE INVENTION

Problems to be Solved by the Invention

The present invention has been made in view of the problems as referred to above, and has for its object to provide a technique of detecting the deterioration of a catalyst at an earlier time and in a more accurate manner.

Means for Solving the Problems

In order to achieve the above-mentioned object, a catalyst deterioration detection apparatus for an internal combustion engine according to the present invention adopts the following means. That is, a catalyst deterioration detection apparatus for an internal combustion engine according to the present invention is one which includes:

a catalyst that is arranged in an exhaust passage of the internal combustion engine and has an oxidation function;

downstream side temperature detection means that detects the temperature of an exhaust gas at a downstream side from said catalyst; and addition means that adds a reducing agent into the exhaust gas from an upstream side from said catalyst; and which is characterized by comprising:

correlation value calculation means that calculates a correlation value which is correlated with an amount of change of the temperature detected by said downstream side temperature detection means when the reducing agent is added by said addition means and when a transient operation of said internal combustion engine is carried out; and determination means that determines a deterioration of said catalyst by making a comparison between said correlation value and a threshold value which indicates the deterioration of said catalyst.

When the reducing agent is added into the exhaust gas by the addition means, the reducing agent flows into the catalyst together with the exhaust gas. Then, when the reducing agent is oxidized by the catalyst, heat is generated, thereby causing the temperature of the catalyst to rise. In addition, as the temperature of the catalyst rises, the temperature of the exhaust gas flowing out of the catalyst also rises. The amount of temperature rise and the rate of temperature rise at this time are affected by the influence of the deterioration of the catalyst.

However, during acceleration, the flow rate of the exhaust gas is high, and the amount of reducing agent added is also large. Then, that part of the catalyst in which the reducing agent thus added reacts changes in accordance with the extent of the deterioration of the catalyst. That is, with a normal catalyst in which deterioration has not occurred, the reducing agent reacts from an upstream side portion of the catalyst, so generation of heat takes place in the upstream side part of the catalyst. This heat is carried away by the exhaust gas, so that it is given to a downstream side portion of the catalyst. That is, the heat will be supplied to the catalyst as a whole. For this reason, the temperature of the exhaust gas flowing out from the catalyst becomes relatively low.

On the other hand, the extent of the deterioration of the catalyst becomes larger in the more upstream side portion thereof, as a consequence of which, as the deterioration progresses, the reducing agent will become difficult to react in the upstream side portion of the catalyst. For this reason, in a deteriorated catalyst, during acceleration, the reducing agent reacts in the downstream side portion of the catalyst. Here, when generation of heat takes place in the downstream side portion of the catalyst, the heat thus generated will be carried away from the catalyst by the exhaust gas. At this time, the temperature of the catalyst mainly goes up in the downstream side portion of the catalyst, but does not go up so much in the upstream side portion. That is, in accordance with the increasing deterioration of the catalyst, the reaction part of the reducing agent moves to the downstream side from the catalyst, so the volume of the catalyst which receives the reaction heat accordingly becomes smaller. As a result, the heat carried by the exhaust gas flowing out of the catalyst increases in accordance with the increasing deterioration of the catalyst, and hence, the temperature of the exhaust gas at the downstream side form the catalyst becomes higher in the case of the deteriorated catalyst than in the case of the normal catalyst.

In addition, during deceleration, the amount of reducing agent to be added will also be small, or the reducing agent will not be added at all. Then, because the heat held by the catalyst is carried away by the exhaust gas, the temperature of the catalyst drops, and at the same time, the temperature of the exhaust gas flowing out of the catalyst also becomes low. Here, in the normal catalyst in which no deterioration has occurred, during acceleration, heat has been supplied to the whole of the catalyst, so the heat has been stored in the catalyst as a whole. For this reason, though the exhaust gas takes heat from the catalyst, the rate of drop of the temperature of the catalyst is low.

On the other hand, as the deterioration of the catalyst progresses, heat will be stored in the downstream side portion of the catalyst during acceleration, so the amount of heat stored in the catalyst as a whole is smaller in the deteriorated catalyst than in the normal catalyst. For this reason, when the exhaust gas takes heat from the catalyst during deceleration, the rate of drop of the temperature of the catalyst becomes higher when the catalyst has deteriorated than not. That is, the rate of drop of the temperature of the exhaust gas flowing out of the catalyst at the time of deceleration becomes high, and the amount of drop thereof also becomes large.

In this manner, as the deterioration of the catalyst progresses, the temperature of the exhaust gas at the downstream side from the catalyst becomes high at the time of acceleration, and low at the time of deceleration. For this reason, a determination as to whether the catalyst has deteriorated or not can be made by detecting the temperature of the exhaust gas at the downstream side from the catalyst, and comparing a correlation value correlated with the amount of change of this temperature with a threshold value. Here, note that as such a comparison, there can be mentioned a difference or a ratio thereof, for example. In this manner, it is possible to carry out the determination of the deterioration of the catalyst at the time of transient operation, thus making it possible to increase the opportunity for the determination of catalyst deterioration.

In the present invention, said correlation value is a difference between a maximum value of a temperature detected by said downstream side temperature detection means at the time of acceleration, and a temperature detected by said downstream side temperature detection means after the acceleration, and said determination means can make a determination that said catalyst has deteriorated, when this difference becomes larger than the threshold value.

That is, as the deterioration of the catalyst progresses, the range of drop of the temperature after acceleration becomes larger, and hence, when the range of drop becomes equal to or larger than the threshold value, a determination can be made that the catalyst has deteriorated. For example, at the time when the range of drop becomes equal to or larger than the threshold value during deceleration, a determination may be made that the catalyst has deteriorated, or when the range of temperature drop after a prescribed period of time has elapsed from the start of deceleration becomes equal to or larger than the threshold value, a determination may be made that the catalyst has deteriorated. Here, note that the threshold value is an upper limit value of the range of drop of the temperature which is detected when the catalyst is normal.

Moreover, said correlation value may be a difference between a maximum value of a temperature detected by said downstream side temperature detection means at the time of acceleration, and a temperature detected by said downstream side temperature detection means before the acceleration. Then, said determination means may make a determination that said catalyst has deteriorated, when this difference becomes larger than a threshold value.

That is, as the deterioration of the catalyst progresses, the range of rise of the temperature during acceleration becomes larger, and hence, when the range of rise becomes equal to or larger than the threshold value, a determination can be made that the catalyst has deteriorated. For example, at the time when the range of rise becomes equal to or larger than the threshold value during acceleration, a determination may be made that the catalyst has deteriorated, or when the range of temperature rise after a prescribed period of time has elapsed from the start of acceleration becomes equal to or larger than the threshold value, a determination may be made that the catalyst has deteriorated. The threshold value at this time is an upper limit value of the range of rise of the temperature which is detected when the catalyst is normal.

Further, said correlation value may also be a rate of change of the temperature detected by said downstream side temperature detection means. Then, said determination means may make a determination that said catalyst has deteriorated, when this rate of change becomes out of a specified range. The rate of change can also be a rate of rise or a rate of drop.

That is, as the deterioration of the catalyst progresses, the rate of rise of the temperature during acceleration and the rate of drop of the temperature during deceleration become larger, and hence, when the rate of rise or the rate of drop becomes equal to or larger than a threshold value, a determination can be made that the catalyst has deteriorated. The threshold value at this time is an upper limit value of the rate of rise or the rate of drop of the temperature which is detected when the catalyst is normal. In addition, for example, when the rate of change of the temperature during acceleration or deceleration becomes out of a specified range, a determination may be made that the catalyst has deteriorated, or when the rate of change after a prescribed period of time has elapsed from the start of acceleration or deceleration becomes out of the specified range, a determination may be made that the catalyst has deteriorated. Here, note that the rate of change may also be an amount of change per unit time, or an amount of change in a prescribed period of time.

In the present invention, said determination means can make a determination at the time when a period of time in which said internal combustion engine is decelerated after acceleration thereof is within a prescribed period of time which is decided based on an amount of intake air in said internal combustion engine.

Here, when the internal combustion engine is decelerated, heat is taken from the catalyst by the exhaust gas. Accordingly, if the period of time in which the internal combustion engine is decelerated is long, the temperature of the catalyst will become low irrespective of whether the catalyst is normal or not. For this reason, when the period of time has passed too much from the start of deceleration, the relation between the correlation value and the extent of the deterioration of the catalyst will become weak, and the accuracy of the determination of catalyst deterioration will decrease. Thus, in such a case, the deterioration determination is not carried out. Then, the larger the amount of intake air, the larger becomes the amount of the exhaust gas which passes through the catalyst, and hence, the larger becomes the amount of temperature drop of the catalyst. In other words, the amount of intake air and the extent or degree of drop of the temperature of the catalyst are in a correlation. Accordingly, it is possible to decide, based on the amount of intake air in the internal combustion engine, the timing at which the determination of catalyst deterioration can be made. Here, note that the prescribed period of time can be a period of time in which correlation values are detected which are different from each other between a case where the catalyst is normal and a case where catalyst has deteriorated, or a period of time in which a difference occurs in a heat generation part of the catalyst.

In the present invention, said determination means can make a determination at the time when a period of time in which said internal combustion engine is accelerated is within a prescribed period of time which is decided based on an amount of intake air in said internal combustion engine.

Here, at the time of the engine being accelerated, heat is provided to the catalyst by means of the exhaust gas. For this reason, if the period of time in which the internal combustion engine is accelerated is long, the temperature of the catalyst will become high irrespective of whether the catalyst is normal or not. Accordingly, when the period of time has passed too much from the start of acceleration, the relation between the correlation value and the extent of the deterioration of the catalyst will become weak, and the accuracy of the determination of catalyst deterioration will decrease. Thus, in such a case, the deterioration determination is not carried out. Then, the larger the amount of intake air, the larger becomes the amount of the exhaust gas which passes through the catalyst, and hence, the larger becomes the amount of temperature rise of the catalyst. In other words, the amount of intake air and the extent or degree of rise of the temperature of the catalyst are in a correlation. Accordingly, it is possible to decide, based on the amount of intake air in the internal combustion engine, the timing at which the determination of catalyst deterioration can be made. Here, note that the prescribed period of time can be a period of time in which correlation values are detected which are different from each other between a case where the catalyst is normal and a case where catalyst has deteriorated, or a period of time in which a difference occurs in a heat generation part of the catalyst. In addition, the prescribed period of time may be a period of time in which an integrated value of a product of the amount of intake air in the internal combustion engine and the temperature of the exhaust gas at the upstream side from the catalyst becomes equal to or less than a predetermined value. That is, at the time of acceleration, the higher the temperature of the exhaust gas, the higher becomes the temperature of the catalyst, and hence, the smaller becomes the difference in the correlation value between a case where the catalyst is normal and a case where the catalyst has deteriorated. Accordingly, by deciding the prescribed period of time based on the integrated value of the product of the amount of intake air in the internal combustion engine and the temperature of the exhaust gas at the upstream side from the catalyst, the accuracy of the determination of catalyst deterioration can be enhanced to a further extent.

In the present invention, provision is made for:

normal temperature estimation means that estimates a temperature of said catalyst when it is assumed that there is no deterioration in said catalyst; and abnormal temperature estimation means that estimates a temperature of said catalyst when it is assumed that said catalyst has deteriorated;

wherein said determination means can make a determination at the time when a difference between a temperature estimated by said abnormal temperature estimation means and a temperature estimated by said normal temperature estimation means, at the time of the end of acceleration, is equal to or larger than a threshold value.

Here, depending on the operating state of the internal combustion engine, the reducing agent may react from the upstream side portion of the catalyst, even if the catalyst has deteriorated, and on the other hand, the reducing agent may react from the downstream side portion of the catalyst, even if the catalyst is normal. That is, there may be no difference in the correlation value between the case where the catalyst is normal and the case where the catalyst has deteriorated. Thus, in such a case, the accuracy of the deterioration determination becomes low. In contrast to this, by carrying out the determination of catalyst deterioration only when a difference occurs in the correlation value between the case where the catalyst is normal and the case where the catalyst has deteriorated, it is possible to enhance the accuracy of the deterioration determination. Then, it is considered that if there is a sufficient difference between a temperature estimated by said abnormal temperature estimation means and a temperature estimated by said normal temperature estimation means, a difference will occur in the correlation value. Here, note that the time when it is assumed that there is no deterioration in the catalyst is a time when the catalyst is normal, and it may be a time when the catalyst is a new one. Also, the time when it is assumed that the catalyst has deteriorated may be a time when the extent of the deterioration of the catalyst exceeds an allowable range. Further, note that "at the time of the end of acceleration" may also instead be at the time of the start of deceleration. In addition, the threshold value referred to herein can be a temperature difference in which correlation values are detected which are different from each other between a case where the catalyst is normal and a case where catalyst has deteriorated, or a temperature difference in which a difference occurs in the heat generation part of the catalyst. Moreover, the normal temperature estimation means and the abnormal temperature estimation means may estimate the temperature of the upstream side portion of the catalyst.

In the present invention, said determination means can make a determination only at the time when an idle operation has been carried out immediately before the acceleration of said internal combustion engine. When the internal combustion engine is accelerated from an idle state, a difference in the heat generation part will be easy to occur between the normal catalyst and the deteriorated catalyst at the time of acceleration, so the determination of catalyst deterioration becomes easy. In addition, the accuracy of the deterioration determination can be enhanced.

In the present invention, said determination means can make a determination only at the time when an amount of intake air in said internal combustion engine and a temperature of the exhaust gas flowing into said catalyst, during acceleration of said internal combustion engine, are within prescribed ranges, respectively.

For example, when the amount of intake air in the internal combustion engine is too much, the flow rate of the exhaust gas becomes large, and so, even in the case of the normal catalyst, heat is not generated in the upstream side portion thereof. On the other hand, when the amount of intake air in the internal combustion engine is too small, the flow rate of the exhaust gas becomes small, and hence, even in the case of the deteriorated catalyst, heat is generated from the upstream side portion thereof. Thus, even if the amount of intake air in the internal combustion engine is too large or too small, no difference will occur in the heat generation part between the normal catalyst and the deteriorated catalyst. In addition, if the temperature of the exhaust gas flowing into the catalyst is too high, heat will be generated first from the upstream side portion of the catalyst even in the case of the deteriorated catalyst. On the other hand, if the temperature of the exhaust gas flowing into the catalyst is too low, heat will be generated first from the downstream side portion of the catalyst even in the case of the normal catalyst. Thus, even if the temperature of the exhaust gas flowing into the catalyst is too high or too low, no difference will occur in the heat generation part between the normal catalyst and the deteriorated catalyst. In contrast to these, the prescribed ranges are set for the amount of intake air in the internal combustion engine and the temperature of the exhaust gas flowing into said catalyst, respectively, and the determination of catalyst deterioration is carried out only when they are within the prescribed ranges, respectively. According to this, the accuracy of the determination of catalyst deterioration can be enhanced. These prescribed ranges can each be set to a range in which a difference will occur in the heat generation part between the normal catalyst and the deteriorated catalyst.

In the present invention, provision can be made for:

upstream side temperature detection means that detects a temperature of the exhaust gas at an upstream side from said catalyst;

heat amount calculation means that calculates a total amount of the amounts of heat generation in said catalyst at the time of the addition of the reducing agent, from a difference between the temperature detected by said downstream side temperature detection means and the temperature detected by said upstream side temperature detection means;

heat amount estimation means that estimates a total amount of the amounts of heat generation in said catalyst at the time of the addition of the reducing agent when it is assumed that said addition means is normal, based on an extent of the deterioration of said catalyst determined by said determination means; and addition abnormality determination means that determines said addition means to be normal, in cases where the total amount of the amounts of heat generation calculated by said heat amount calculation means is within a predetermined range of the total amount of the amounts of heat generation estimated by said heat amount estimation means, but determines said addition means to be abnormal, in cases where the total amount of the amounts of heat generation calculated by said heat amount calculation means is out of the predetermined range of the total amount of the amounts of heat generation estimated by said heat amount estimation means.

Here, in cases where the amount of reducing agent added from the addition means decreases, the amount of heat generated in the catalyst also decreases. In addition, in cases where the catalyst has deteriorated, too, the amount of heat generated in the catalyst decreases. That is, with the use of only the amount of heat generation, it is impossible to distinguish whether the catalyst has deteriorated or the amount of reducing agent has decreased. However, said correlation value differs depending on the case where the catalyst has deteriorated and the case where the amount of addition of the reducing agent from the addition means has decreased, and hence, first, it can be determined whether the catalyst has deteriorated. That is, in cases where the catalyst has deteriorated, the amount of change of the temperature detected by the downstream side temperature detection means becomes large, but in cases where the amount of reducing agent to be added has decreased, the amount of change of the temperature detected by the downstream side temperature detection means becomes small. According to these differences, it is possible to determine whether the catalyst has deteriorated.

Then, when the deterioration determination of the catalyst is completed, it can be determined, based on the amount of heat generation, whether the amount of reducing agent added from the addition means has decreased or not. However, the extent of the deterioration of the catalyst affects the amount of heat generation, and so, when determining a decrease in the amount of reducing agent, a decreased part of the amount of heat generation due to the deterioration of the catalyst is taken into consideration. That is, assuming that the total amount of the amounts of heat generation calculated by the heat amount calculation means is a total amount of the actual amounts of heat generation at the time of the addition of the reducing agent, this total amount of the amounts of heat generation decreases according to the extent of the deterioration of the catalyst. Then, the heat amount estimation means estimates the total amount of the amounts of heat generation based on the extent of the deterioration of the catalyst. This total amount of the amounts of heat generation is the total amount of the amounts of heat generation in the case of assuming that the addition means is normal. That is, it is the total amount of the amounts of heat generation in consideration of the influence of the extent of the deterioration of the catalyst. When the total amount of the actual amounts of heat generation is lower to a certain extent than this total amount of the amounts of heat generation estimated by the heat amount estimation means, a determination is made that the addition means is abnormal. The determination of the abnormality which is made at the time how low the total amount of the amounts of heat generation becomes is decided by a regulated value, etc.

That is, the predetermined range is a range in which it can be said that the addition means is normal.

In order to achieve the above-mentioned object, a catalyst deterioration detection method for an internal combustion engine according to the present invention adopts the following means. That is, a catalyst deterioration detection method for an internal combustion engine according to the present invention is characterized by comprising:

a first step to calculate a correlation value which has a correlation with an amount of change of a temperature of an exhaust gas at a downstream side from said catalyst, when a transient operation of said internal combustion engine is carried out during the time when a reducing agent is added into an exhaust gas from an upstream side from a catalyst which has an oxidation function and is arranged in an exhaust passage of the internal combustion engine; and a second step to determine a deterioration of said catalyst by comparing said correlation value with a threshold value which indicates the deterioration of said catalyst.

Said correlation value is calculated as a difference between a maximum value of a temperature of the exhaust gas at the downstream side from the catalyst at the time of acceleration, and a temperature of the exhaust gas at the downstream side from the catalyst after the acceleration, and in said second step, a determination can be made that said catalyst has deteriorated, when this difference becomes larger than the threshold value.

In said second step, a determination can be made at the time when a period of time in which said internal combustion engine is decelerated after acceleration thereof is within a prescribed period of time which is decided based on an amount of intake air in said internal combustion engine.

The catalyst deterioration detection method for an internal combustion engine may be constructed to further comprise:

a third step to calculate a total amount of the amounts of heat generation in said catalyst at the time of the addition of the reducing agent, from a difference between a temperature of the exhaust gas at the downstream side from said catalyst and a temperature of the exhaust gas at the upstream side from said catalyst;

a fourth step to estimate a total amount of the amounts of heat generation in said catalyst at the time of the addition of the reducing agent when it is assumed that an amount of addition of the reducing agent is normal, based on an extent of the deterioration of said catalyst determined by said second step; and a fifth step to determine the amount of addition of the reducing agent to be normal, in cases where the total amount of the amounts of heat generation calculated by said third step is within a predetermined range of the total amount of the amounts of heat generation estimated by said fourth step, but to determine the amount of addition of the reducing agent to be abnormal, in cases where the total amount of the amounts of heat generation calculated by said third step is out of the predetermined range of the total amount of the amounts of heat generation estimated by said fourth step.

Effect of the Invention

According to the present invention, it is possible to detect the deterioration of a catalyst in an earlier time with a higher degree of accuracy.

MODES FOR CARRYING OUT THE INVENTION

Hereinafter, reference will be made to specific modes of embodiments of a catalyst deterioration detection apparatus and a catalyst deterioration detection method for an internal combustion engine according to the present invention based on the attached drawings.

[First Embodiment]

Figure 1:
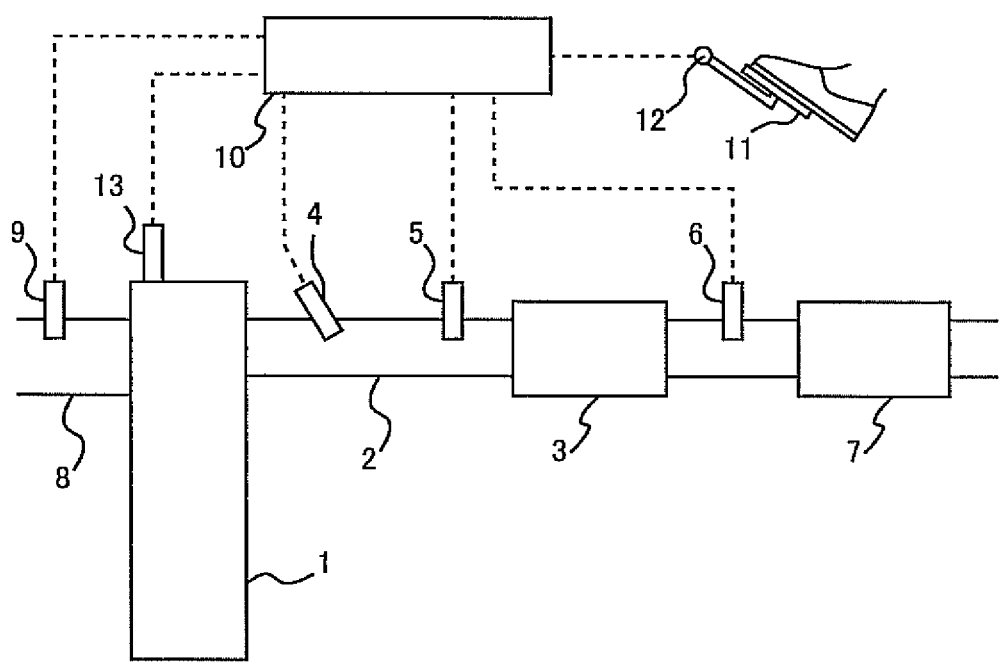
[FIG. 1] is a view showing the schematic construction of an internal combustion engine and its intake and exhaust systems according to an embodiment of the present invention.

FIG. 1 is a view showing the schematic construction of an internal combustion engine and its exhaust system according to this embodiment of the present invention. The internal combustion engine 1 shown in FIG. 1 is a diesel engine having four cylinders. Here, note that this embodiment and the following embodiments can also be applied even to gasoline internal combustion engines.

An exhaust passage 2 is connected to the internal combustion engine 1. A catalyst 3 is arranged in the middle of this exhaust passage 2. The catalyst 3 need only be a catalyst which has a function to oxidize a reducing agent, and which is, for example, an oxidation catalyst, a three-way catalyst, or a NOx catalyst. Here, note that in this embodiment, the catalyst 3 corresponds to a catalyst having an oxidation function according to the present invention.

In addition, an addition valve 4, which serves to add or inject fuel (light oil) as the reducing agent into an exhaust gas, is mounted on the exhaust passage 2 at the upstream side from the catalyst 3. The addition valve 4 is opened by means of a signal from an ECU 10 which will be described later, so that it injects fuel into the exhaust gas. Here, note that in this embodiment, the addition valve 4 corresponds to addition unit in the present invention.

An upstream side temperature sensor 5 for measuring the temperature of the exhaust gas is mounted on the exhaust passage 2 at a location downstream of the addition valve 4 and upstream of the catalyst 3. In addition, a downstream side temperature sensor 6 for measuring the temperature of the exhaust gas is mounted on the exhaust passage 2 at a location downstream of the catalyst 3. The upstream side temperature sensor 5 measures the temperature of the exhaust gas which flows into the catalyst 3. Also, the downstream side temperature sensor 6 measures the temperature of the exhaust gas which flows out of the catalyst 3. Here, note that in this embodiment, the downstream side temperature sensor 6 corresponds to downstream side temperature sensor in the present invention. Moreover, in this embodiment, the upstream side temperature sensor 5 corresponds to upstream side temperature sensor in the present invention.

A filter 7, which serves to trap particulate matter (PM) in the exhaust gas, is arranged in the exhaust passage 2 at a location downstream of the downstream side temperature sensor 6.

In addition, an intake passage 8 is connected to the internal combustion engine 1. In the intake passage 8, there is arranged an air flow meter 9 that outputs a signal corresponding to a flow rate of intake air flowing in the intake passage 8. By means of this air flow meter 9, an amount of intake air sucked into the internal combustion engine 1 is metered or measured.

In the internal combustion engine 1 constructed as stated above, there is arranged in combination therewith the ECU 10 which is an electronic control unit for controlling the internal combustion engine 1. This ECU 10 controls the operating state of the internal combustion engine 1 in accordance with the operating conditions of the internal combustion engine 1 and/or driver's requirements.

Further, besides the above-mentioned sensors, an accelerator opening sensor 12, which serves to detect an engine load by outputting an electrical signal corresponding to an amount by which a driver stepped on or depressed an accelerator pedal 11, and a crank position sensor 13, which serves to detect the number of revolutions per minute of the engine, are connected to the ECU 10 through electrical wiring, and the output signals of these variety of kinds of sensors are inputted to the ECU 10. On the other hand, the addition valve 4 is connected to the ECU 10 through electrical wiring, so that the opening and closing timing of the addition valve 4 is controlled by the ECU 10.

Then, when the amount of particulate matter trapped by the filter 7 reaches a threshold value, the ECU 10 supplies the reducing agent to the catalyst 3 from the addition valve 4, thereby causing the temperature of the exhaust gas to rise. As a result of this, the temperature of the filter 7 can be raised, so that the particulate matter can be oxidized and removed from the filter 7. Thus, the filter 7 is regenerated by supplying the reducing agent to the catalyst 3 from the addition valve 4 in this manner. Then, in this embodiment, the determination of deterioration of the catalyst 3 is carried out based on an amount of change of the temperature of the exhaust gas which is measured by means of the downstream side temperature sensor 6 at the time of regeneration of the filter 7 and at the time of the transient operation of the internal combustion engine 1.

Figure 2:
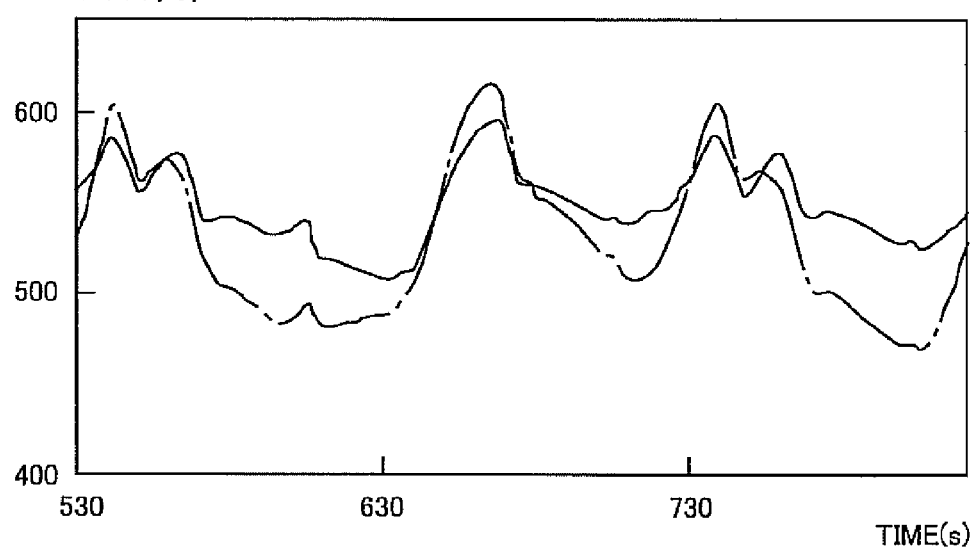
[FIG. 2] is a time chart showing the change over time of the temperature of an exhaust gas at the downstream side from a catalyst.

FIG. 2 is a time chart showing the change over time of the temperature of the exhaust gas at the downstream side from the catalyst 3. A solid line indicates a case in which the catalyst has not deteriorated and is normal, and an alternate long and short dash line indicates a case in which the catalyst has deteriorated. The other conditions are the same between the solid line and the alternate long and short dash line. At the time of acceleration, the temperature of the exhaust gas at the downstream side from the catalyst 3 goes up. In addition, at the time of deceleration, the supply of fuel to combustion chambers of the internal combustion engine 1 is stopped, and the addition of fuel from the addition valve 4 is also stopped. As a result, the temperature of the exhaust gas at the downstream side from the catalyst 3 goes down. For this reason, as shown in FIG. 2, the temperature of the exhaust gas changes according to acceleration and deceleration. When attention is focused on a maximum value and a minimum value of the temperature at this time, the maximum value of the temperature is larger in the catalyst which has deteriorated than in the catalyst which is normal. Moreover, the minimum value of the temperature is smaller in the catalyst which has deteriorated than in the catalyst which is normal. That is, the difference between the maximum value and the minimum value of the temperature is larger in the catalyst which has deteriorated than in the catalyst which is normal. This is considered due to the following phenomenon.

Figure 3:
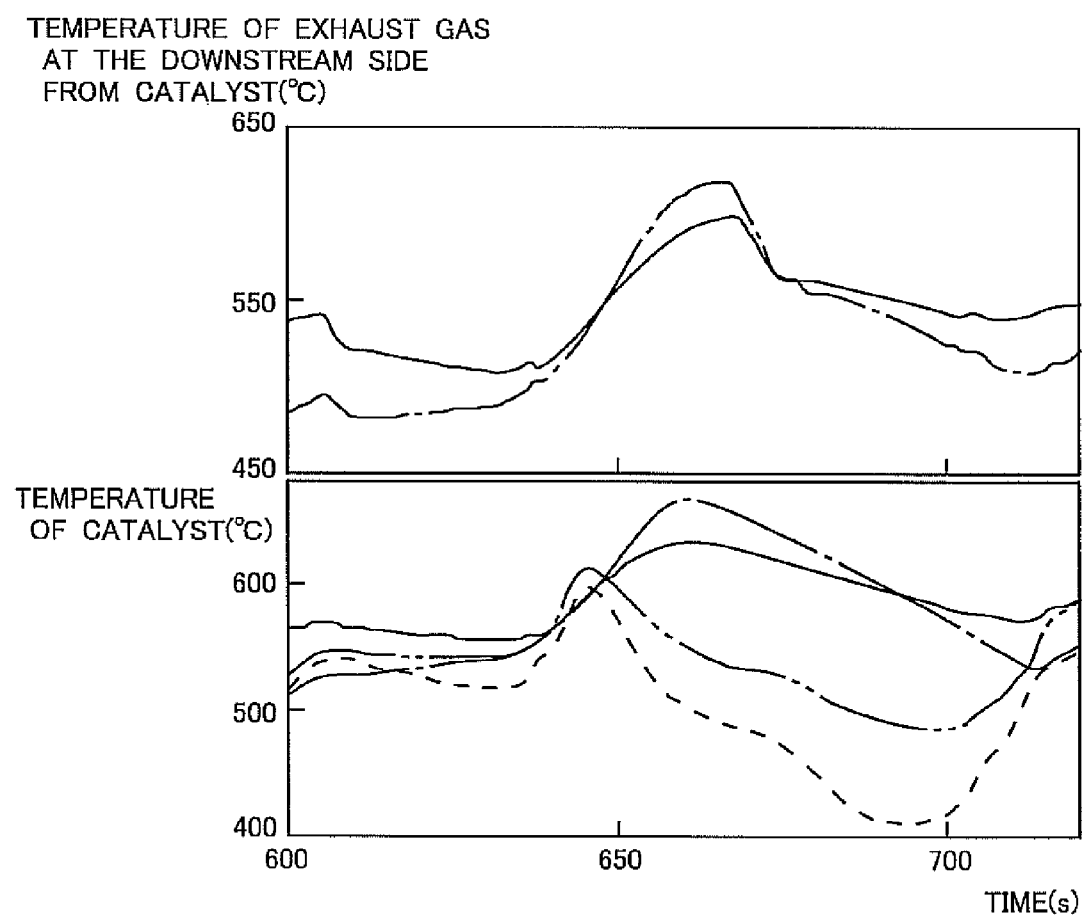
[FIG. 3] is a time chart showing the change over time of the temperature of the catalyst and the temperature of the exhaust gas at the downstream side from the catalyst.

FIG. 3 is a time chart showing the change over time of the temperature of the catalyst 3 and the temperature of the exhaust gas at the downstream side from the catalyst 3. In the temperature of the exhaust gas at the downstream side from the catalyst 3, a solid line indicates a case in which the catalyst 3 is normal, whereas an alternate long and short dash line indicates a case in which the catalyst 3 has deteriorated. In addition, the temperature of the catalyst 3 indicates the temperature inside the catalyst 3. Then, in the temperature of the catalyst 3, a solid line indicates the temperature of a downstream side portion of the catalyst 3 when the catalyst 3 is normal, whereas an alternate long and short dash line indicates the temperature of the downstream side portion of the catalyst 3 when the catalyst 3 has deteriorated, and an alternate long and two short dashes line indicates the temperature of a central portion of the catalyst 3 when the catalyst 3 is normal, whereas a broken line indicates the temperature of the central portion of the catalyst 3 when the catalyst 3 has deteriorated.

Figure 4:
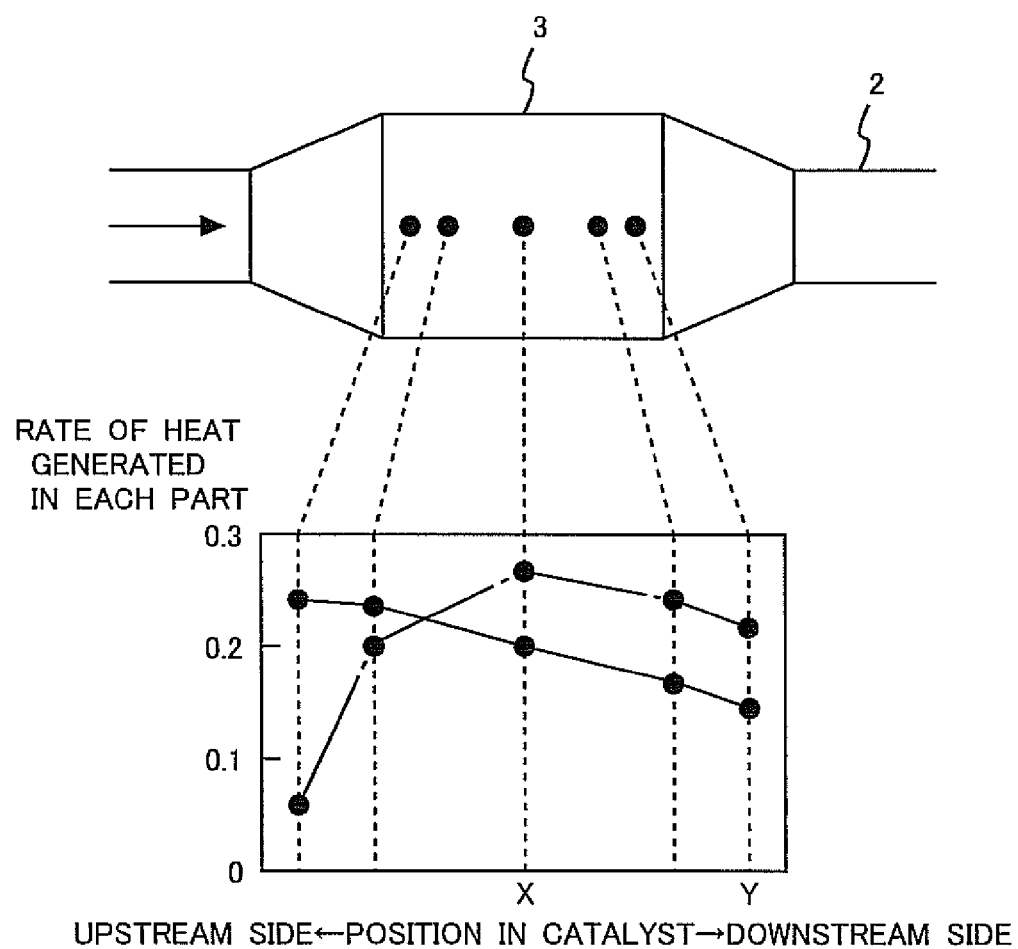
[FIG. 4] is a view showing a temperature distribution of the catalyst at the time of acceleration.

In addition, FIG. 4 is a view showing a temperature distribution of the catalyst 3 at the time of acceleration. This FIG. 4 shows the temperatures of the catalyst 3 measured on a central axis thereof from an upstream side from the catalyst 3 to a downstream side thereof. "The rate of heat generated in each part" is a value which is obtained by dividing an amount of heat generated in each part of the catalyst 3 by a total amount of heat generated in the entire catalyst 3. A solid line indicates a case in which the catalyst 3 is normal, and an alternate long and short dash line indicates a case in which the catalyst 3 has deteriorated. Here, note that X shown in FIG. 4 corresponds to the central portion in FIG. 3, and Y shown in FIG. 4 corresponds to the downstream side portion in FIG. 3.

Here, at the time of acceleration of the internal combustion engine 1, that part of the catalyst 3 in which the reducing agent reacts moves to the downstream side from the catalyst 3 in accordance with the increasing extent of the deterioration of the catalyst 3. As a result of this, the temperature of the upstream side portion of the catalyst 3 becomes lower in accordance with the progress of the deterioration of the catalyst 3. In addition, the heat generated by the reaction of the reducing agent moves to the downstream side portion of the catalyst 3 together with the exhaust gas, so that the temperature of the downstream side portion of the catalyst 3 goes up according to the progress of the deterioration thereof. That is, in cases where the catalyst 3 is normal, the reducing agent reacts in the upstream side portion of the catalyst 3, so the temperature of the upstream side part goes up, and at the same time, heat is supplied to the downstream side portion due to the circulation of the exhaust gas, as a result of which the temperature of the downstream side from the catalyst 3 goes up. For this reason, the temperature of the catalyst 3 as a whole goes up. At this time, the temperature of the catalyst 3 decreases as it goes from its upstream side to its downstream side.

On the other hand, in cases where the catalyst 3 has deteriorated, the reducing agent reacts in the downstream side portion of the catalyst 3, so the temperature of the upstream side portion does not go up so much. In addition, because heat is generated in the downstream side portion of the catalyst 3, the heat supplied to the exhaust gas flows out of the catalyst 3, without being again given to the catalyst 3. Thus, as the deterioration of the catalyst 3 progresses, the heat given to the catalyst 3 decreases, so that the temperature of the exhaust gas flowing out of the catalyst 3 becomes higher. This can be said that the volume (heat capacity) of the catalyst in which heat is received is decreasing in accordance with the progress of the deterioration.

Moreover, at the time of deceleration of the internal combustion engine 1, the heat which has been stored in the catalyst 3 at the time of acceleration moves to the exhaust gas which is low in temperature. As a result of this, the temperature of the catalyst 3 goes down or drops. At this time, when the catalyst 3 has deteriorated, heat has not been stored so much in the upstream side portion of the catalyst 3, so the amount of heat stored is smaller as compared with the normal catalyst. For this reason, the extent of temperature drop of the catalyst 3 becomes larger. At a result, the extent of the temperature drop of the exhaust gas at the downstream side from the catalyst 3 becomes larger.

Figure 5:
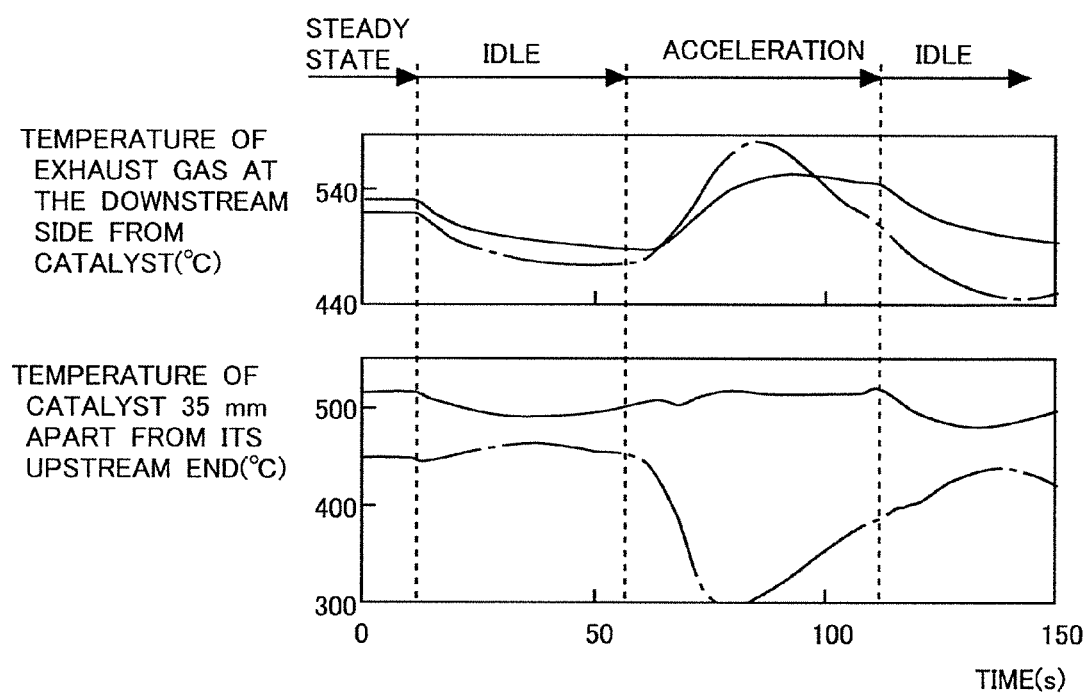
[FIG. 5] is a time chart showing the change over time of the temperature of the exhaust gas at the downstream side from the catalyst, and the temperature of the catalyst at a location 35 mm apart downstream from an upstream side end thereof.

FIG. 5 is a time chart showing the change over time of the temperature of the exhaust gas at the downstream side from the catalyst 3, and the temperature of the catalyst 3 at a location 35 mm apart downstream from an upstream side end thereof. A solid line indicates a case in which the catalyst 3 is normal, and an alternate long and short dash line indicates a case in which the catalyst 3 has deteriorated. FIG. 5 shows a case in which after a sufficiently long steady state operation, the engine is shifted to an idle operation, and thereafter an acceleration operation is carried out, after which the engine is further shifted to an idle operation. In a period of time indicated by "acceleration" in FIG. 5, after an acceleration operation is carried out, a deceleration operation is carried out. Here, note that "the temperature of the catalyst 3 at a location 35 mm apart downstream from an upstream side end thereof" indicates a representative temperature of the upstream side portion of the catalyst 3.

In the deteriorated catalyst 3, a maximum value of the temperature of the exhaust gas at the downstream side from the catalyst 3 at the time of acceleration becomes larger as compared with the normal catalyst 3. On the other hand, in the deteriorated catalyst 3, a minimum value of the temperature of the exhaust gas at the downstream side from the catalyst 3 becomes smaller at the time of idle operation, as compared with the normal catalyst 3. In addition, in the deteriorated catalyst, a heat generation part thereof moves to the downstream side thereof, and hence, the temperature of the catalyst at a location 35 mm apart downstream from the upstream end thereof becomes lower, as compared with the normal catalyst 3. This becomes more remarkable at the time of acceleration.

In this manner, the heat generation part of the catalyst 3 moves to the downstream side thereof according to the extent of the deterioration of the catalyst 3, as a result of which the temperature of the exhaust gas at the downstream side from the catalyst 3 changes. By using this phenomenon, it is possible to determine the extent of the deterioration of the catalyst 3, based on the temperature of the exhaust gas at the downstream side from the catalyst 3. In general, in order to specify the heat generation part in the catalyst 3, it is necessary to add a sensor, etc., but according to this embodiment, the heat generation part can be specified by the use of the existing downstream side temperature sensor 6.

Then, a difference (a temperature change width or range) between the maximum value of the temperature of the exhaust gas at the downstream side from the catalyst 3 at the time of acceleration and the minimum value of the temperature of the exhaust gas at the downstream side from the catalyst 3 at the time of deceleration is obtained. When this temperature change range is equal to or less than a threshold value, a determination is made that the catalyst 3 is normal, whereas when the temperature change range is larger than the threshold value, a determination is made that the catalyst 3 has deteriorated.

Figure 6:
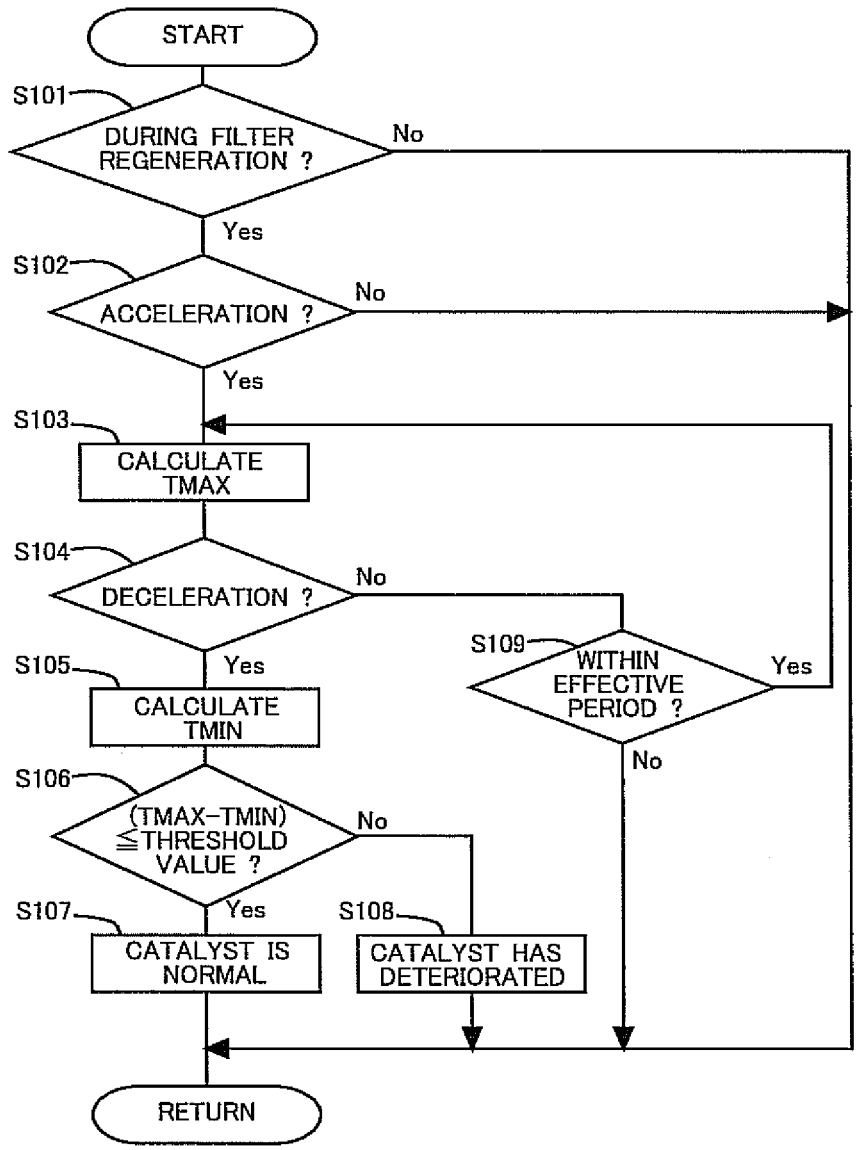
[FIG. 6] is a flow chart showing a flow for the determination of deterioration of a catalyst according to a first embodiment of the present invention.

FIG. 6 is a flow chart which shows a flow or routine for the determination of deterioration of the catalyst 3 according to this embodiment. This routine is carried out by means of the ECU 10 at each predetermined time interval.

In step S101, it is determined whether the filter 7 is in the process of regeneration. That is, it is determined whether it is in a state where the reducing agent is supplied from the addition valve 4. In this step, it is determined whether a prerequisite or precondition for performing the determination of deterioration of the catalyst 3 is satisfied. In cases where an affirmative determination is made in step S101, the routine advances to step S102, whereas in cases where a negative determination is made, the deterioration determination of the catalyst 3 can not be made, and hence, this routine is ended.

In step S102, it is determined whether an acceleration condition is satisfied. The acceleration condition is divided into a condition before acceleration and a condition during acceleration. Then, when both the condition before acceleration and the condition during acceleration are satisfied, a determination is made that the acceleration condition is satisfied.

First, the condition before acceleration is set such that the generation of heat takes place in the upstream side portion of the catalyst 3 irrespective of whether the catalyst 3 is normal or not. Specifically, the condition before acceleration is set such that the amount of the exhaust gas passing through the catalyst 3 is equal to or less than a specified amount value, and that the temperature of the exhaust gas flowing into the catalyst 3 is equal to or less than a specified temperature value.

Here, if the generation of heat takes place in the upstream side portion of the catalyst 3 before acceleration, it becomes easy for the difference in the temperature change range between the normal catalyst 3 and the deteriorated catalyst 3 to take place at the time of acceleration. That is, the deterioration determination becomes easy. For this reason, one of the conditions is set such that the amount of the exhaust gas passing through the catalyst 3 is equal to or less than the specified amount value. This specified value is an amount of the exhaust gas with which the reducing agent reacts from the upstream side portion, even in the case of the deteriorated catalyst 3, and it is, for example, 10 g/s. Then, when there is a large amount of exhaust gas passing through the catalyst 3, it becomes difficult for the reducing agent to react in the upstream side portion of the catalyst 3, and so the deterioration determination of the catalyst 3 becomes difficult. As a result, in such a case, the deterioration determination is not carried out.

In addition, for example, one of the conditions is set such that the temperature of the exhaust gas flowing into the catalyst 3 is equal to or lower than a specified temperature value. That is, if acceleration is carried out from a state where the temperature of the catalyst 3 is low, it becomes easy for the difference in the temperature change range between the normal catalyst 3 and the deteriorated catalyst 3 to take place. This specified value is 240 degrees C., for example. Here, note that by measuring or estimating the amount of the exhaust gas or the temperature of the exhaust gas passing through the catalyst 3, it may be determined whether these conditions are satisfied, but there is a high possibility that these conditions will be satisfied, for example, during idle operation, so idle operation having been carried out before acceleration may be set as the condition before acceleration.

Then, the condition during acceleration is set as a state in which in the case of the normal catalyst 3, the temperature thereof will go up first from the upstream side portion thereof, whereas in the case of the deteriorated catalyst 3, the temperature thereof will go up first from the downstream side portion thereof. Specifically, the condition during acceleration is set such that the amount of the exhaust gas passing through the catalyst 3 is within a specified amount range, and that the temperature of the exhaust gas flowing into the catalyst 3 is within a specified temperature range.

That is, it is determined whether the amount of the exhaust gas is such that the heat generation part in the case when the catalyst 3 has deteriorated becomes the downstream side from the catalyst 3, and the heat generation part in the case when the catalyst 3 is normal becomes the upstream side from the catalyst 3. Here, when the amount of exhaust gas passing through the catalyst 3 is too small, heat will be generated from the upstream side portion of the catalyst 3 even in the case of the deteriorated catalyst 3, so the determination of deterioration becomes difficult. On the other hand, when the amount of exhaust gas passing through the catalyst 3 is too large, heat will be generated first in the downstream side portion of the catalyst 3 even in the case of the normal catalyst 3, so the determination of deterioration becomes difficult. Accordingly, one of the conditions is set such that the amount of the exhaust gas passing through the catalyst 3 is within the specified amount range, for example. This specified amount range has beforehand been obtained through experiments, etc. Here, note that the amount of gas passing through the catalyst 3 has a correlation with the amount of intake air, so the determination of deterioration may be made based on the amount of intake air.

Moreover, it is determined whether the temperature of the exhaust gas is such that the heat generation part in the case when the catalyst 3 has deteriorated becomes the downstream side from the catalyst 3, and the heat generation part in the case when the catalyst 3 is normal becomes the upstream side from the catalyst 3. That is, when the temperature of the exhaust gas flowing into the catalyst 3 is too low, it becomes difficult for the temperature of the catalyst 3 to go up even if the catalyst 3 is normal, so the deterioration determination of the catalyst 3 becomes difficult. On the other hand, when the temperature of the exhaust gas flowing into the catalyst 3 is too high, heat will be generated first from the upstream side portion of the catalyst 3 even if the catalyst 3 has deteriorated, so the determination of deterioration becomes difficult. Accordingly, one of the conditions is set such that the temperature of the exhaust gas flowing into the catalyst 3 is within the specified temperature range, for example. This specified temperature range has beforehand been obtained through experiments, etc. Here, note that the temperature of the exhaust gas flowing into the catalyst 3 is a temperature which is detected by the upstream side temperature sensor 5.

In cases where an affirmative determination is made in step S102, the routine advances to step S103, whereas in cases where a negative determination is made, the deterioration determination of the catalyst 3 cannot be made, and hence, this routine is ended.

In step S103, a maximum value TMAX of the temperature detected by the downstream side temperature sensor 6 is calculated. This maximum value TMAX is a maximum value of the temperature detected by the downstream side temperature sensor 6 within a period of time from an acceleration start time to a deceleration start time. Here, note that a temperature detected by the downstream side temperature sensor 6 at the time of the end of acceleration (this may also be at the time of the start of deceleration) may be used as the maximum value TMAX.

In step S104, it is determined whether a deceleration condition is satisfied. That is, it is determined whether it is in a state where the temperature of the reducing agent 3 can drop. For example, in cases where the supply of fuel to the combustion chambers of the internal combustion engine 1 is stopped, a determination is made that the deceleration condition is satisfied. In addition, for example, in cases where an amount of depression of the accelerator pedal 11 obtained by the accelerator opening sensor 12 is equal to or less than a specified value, a determination is made that the deceleration condition is satisfied. Moreover, for example, in cases where the amount of exhaust gas passing through the catalyst 3 is equal to or less than the specified value, and the amount of reducing agent which is added from the addition valve 4 is equal to or less than a specified value, a determination is made that the deceleration condition is satisfied. These specified values may be obtained as values at the time when deceleration is started, through experiments, etc. In cases where an affirmative determination is made in step S104, the routine advances to step S105, whereas in cases where a negative determination is made, the routine advances to step S109.

In step S105, a minimum value TMIN of the temperature detected by the downstream side temperature sensor 6 is calculated. This minimum value TMIN is a minimum value of the temperature detected by the downstream side temperature sensor 6 during deceleration or during idling after deceleration. Here, note that a temperature detected by the downstream side temperature sensor 6 after a prescribed period of time has elapsed from the start of deceleration may be used as the minimum value TMIN. This prescribed period of time is obtained, in advance through experiments, etc., as a period of time in which a difference in the amount of drop of the temperature detected by the downstream side temperature sensor 6 at the time of deceleration takes place between the normal catalyst and the deteriorated catalyst.

In step S106, it is determined whether a difference (temperature change width or range) between the maximum value TMAX and the minimum value TMIN of the temperature is equal to or less than a threshold value. This threshold value has been obtained, in advance through experiments, etc., as an upper limit value of the temperature change range at the time when the catalyst 3 is within a normal range, and has been stored in the ECU 10. Here, note that in this embodiment, the ECU 10, which calculates the difference between the maximum value TMAX and the minimum value TMIN, corresponds to electronic control unit in the present invention. In addition, in this embodiment, the process of calculating the difference between the maximum value TMAX and the minimum value TMIN corresponds to a first step in the present invention. Moreover, in this embodiment, the ECU 10, which determines whether the difference between the maximum value TMAX and the minimum value TMIN of the temperature is equal to or less than the threshold value, corresponds to electronic control unit in the present invention. Further, in this embodiment, the process of determining whether the difference between the maximum value TMAX and the minimum value TMIN of the temperature is equal to or less than the threshold value corresponds to a second step in the present invention.

In cases where an affirmative determination is made in step S106, the routine advances to step S107, in which a determination is made that the catalyst 3 is normal. On the other hand, in cases where a negative determination is made in step S106, the routine advances to step S108, in which a determination is made that the catalyst 3 has deteriorated.

In addition, in step S109, it is determined whether it is within an effective period. The effective period is a period of time in which the determination of deterioration of the catalyst 3 can be carried out. That is, when the period of time in which acceleration is carried out becomes long, the temperature of the upstream side portion of the catalyst 3 will become high irrespective of whether the catalyst 3 is normal or not, so the accuracy in the determination of deterioration of the catalyst 3 will be decreased. In such a case, the determination of deterioration of the catalyst 3 is stopped. That is, the determination of deterioration of the catalyst 3 is carried out within the effective period. For example, after an affirmative determination is made at step S102, a value obtained by multiplying the amount of the exhaust gas flowing into the catalyst 3 by the temperature of the exhaust gas flowing into the catalyst 3 is integrated, and in cases where this integrated value is equal to or less than a specified value, a determination is made that it is within the effective period. The amount of exhaust gas has a correlation with the amount of intake air, and hence, the determination may be made by the use of the amount of intake air in place of the amount of exhaust gas. In addition, when an integrated value of the amount of energy flowing into the catalyst 3 is equal to or less than a predetermined value, it is within the effective period. Moreover, for example, after an affirmative determination is made at step S102, the amount of intake air in the internal combustion engine 1 is integrated, and in cases where this integrated value is equal to or less than a specified value, a determination is made that it is within the effective period. That is, such a determination need only be made by the use of a parameter which has a correlation with the extent of the rise of the temperature of the catalyst 3. In cases where an affirmative determination is made in step S109, the routine returns to step S103, whereas in cases where a negative determination is made, the deterioration determination of the catalyst 3 can not be made, and hence, this routine is ended.

In this manner, the determination of deterioration of the catalyst 3 can be carried out based on the difference between the maximum value of the temperature of the exhaust gas flowing out of the catalyst 3 at the time of acceleration, and the subsequent minimum value thereof. That is, the determination of deterioration of the catalyst 3 can be carried out based on the output value of the downstream side temperature sensor 6 at the time of transient operation.

Figure 7:
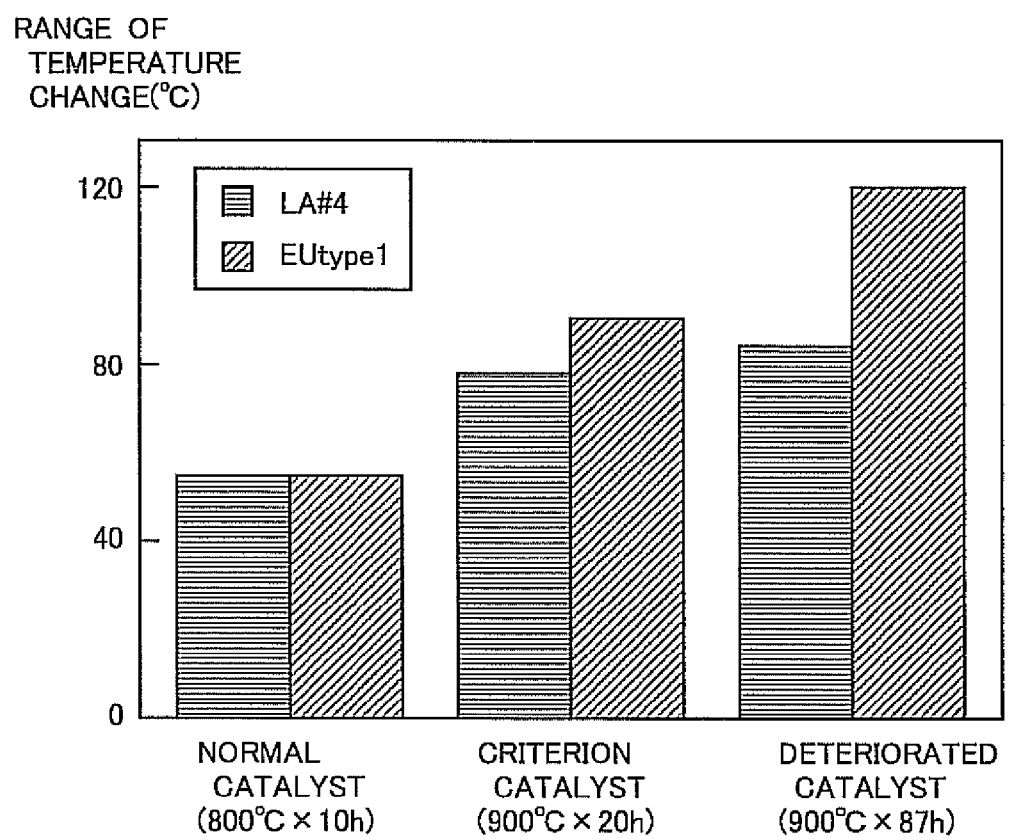
[FIG. 7] is a view showing the width or range of the temperature change which is a value obtained by subtracting a minimum value of the temperature of the catalyst at the time of deceleration from a maximum value of the temperature of the catalyst at the time of acceleration.

Here, FIG. 7 is a view showing the width or range of the temperature change which is a value obtained by subtracting a minimum value of the temperature of the catalyst 3 at the time of deceleration from a maximum value of the temperature of the catalyst 3 at the time of acceleration. FIG. 7 shows the results of measurements in the LA#4 mode and in the EU type1 mode, respectively. The normal catalyst is a catalyst of which the purification ability is in a range which can be said normal, and for example, a catalyst which has been heated at 800 degrees C. for 10 hours. A criterion catalyst has been conventionally in the range which can be said normal, but in this embodiment, it is a catalyst which is determined as a deteriorated catalyst and which is a catalyst with its purification ability just beyond the range which can be said normal. This criterion catalyst is a catalyst which has been heated at 900 degrees C. for 20 hours, for example. The deteriorated catalyst is a catalyst which has exceeded the normal range in its conventional meaning, too, and is a catalyst which has been heated at 900 degrees C. for 87 hours, for example. Even with the criterion catalyst of which the extent of deterioration is small, it is greatly different in the temperature change width or range from the normal catalyst, and hence, the determination of deterioration of such a criterion catalyst can be carried out in an easy manner by the use of the temperature change range.

Figure 8:
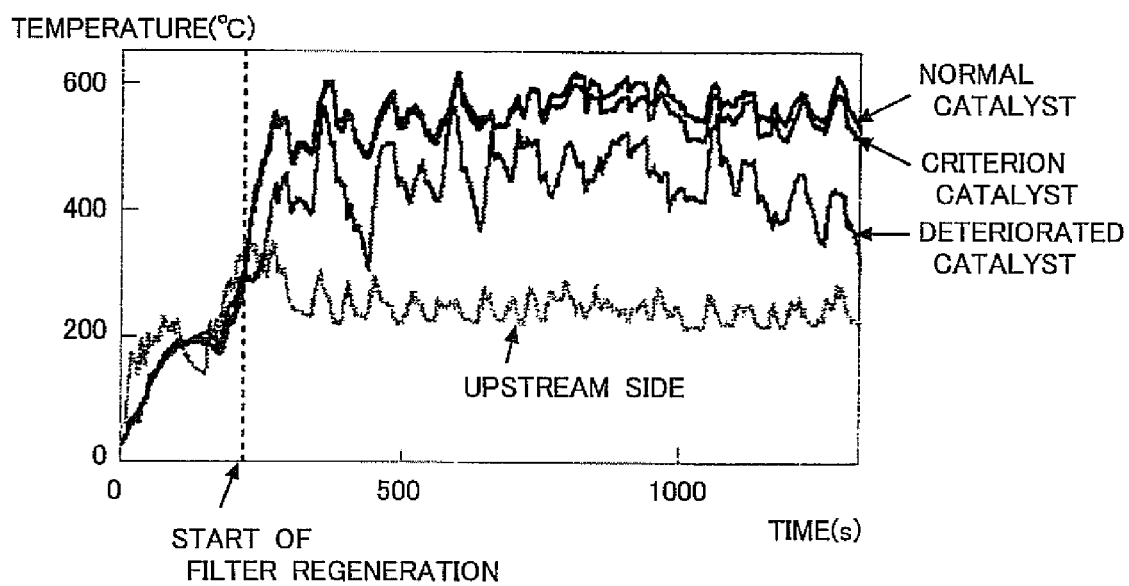
[FIG. 8] is a view showing the change over time of the temperature of the exhaust gas at the time of regenerating a filter during mode running.

On the other hand, FIG. 8 is a view showing the change over time of the temperature of the exhaust gas at the time of regenerating the filter 7 during mode running. "The normal catalyst", "the criterion catalyst", and "the deteriorated catalyst" represent the temperatures of the exhaust gases which flow out of the catalysts, respectively. These temperatures may also be the temperatures detected by the downstream side temperature sensor 6. In addition, "the upstream side" may also be the temperature of the exhaust gas flowing into the catalyst, and may be the temperature measured by the upstream side temperature sensor 5. This temperature of the exhaust gas at the upstream side is not affected by the extent of the deterioration of the catalyst. As can be seen from FIG. 8, in cases where the temperatures of the exhaust gases flowing out of these catalysts are compared with one another, the difference between the normal catalyst and the deteriorated catalyst is large, but the difference between the normal catalyst and the criterion catalyst is small. Accordingly, it is difficult to distinguish the normal catalyst and the criterion catalyst from each other only by comparing the temperatures of the exhaust gases at the downstream side from the catalyst 3.

Figure 9:
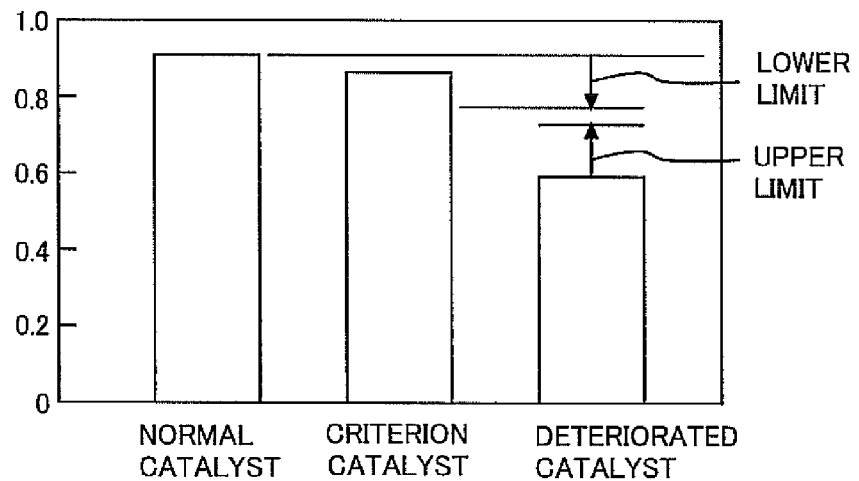
[FIG. 9] is a view showing the rate of heat generation of the catalyst.

In addition, FIG. 9 is a view showing the rates of heat generation of the catalysts. A rate of heat generation is a proportion of an actual amount of heat generation with respect to a required amount of heat generation. The required amount of heat generation is a value which can be obtained from an amount of reducing agent to be added, and is an amount of heat generation at the time when the whole added reducing agent reacts in the catalyst. In addition, the actual amount of heat generation is an amount of heat generation calculated based on the difference between the temperature of the exhaust gas at the downstream side from the catalyst, and the temperature of the exhaust gas at the upstream side from the catalyst. A "lower limit" is a rate of heat generation of the normal catalyst, and is a lower limit value when variation is taken into consideration. An "upper limit" is a rate of heat generation of the deteriorated catalyst, and is an upper limit value when variation is taken into consideration. The upper limit value of the deteriorated catalyst is larger than the lower limit value of the normal catalyst, so the normal catalyst and the deteriorated catalyst can be distinguished by using the rate of heat generation. However, the rate of heat generation of the criterion catalyst is sometimes larger than the lower limit value of the rate of heat generation of the normal catalyst, so it is difficult to distinguish the normal catalyst and the criterion catalyst from each other by the use of the rate of heat generation. Accordingly, it is difficult to distinguish the normal catalyst and the criterion catalyst from each other only by comparing the differences between the temperature of the exhaust gas flowing out form the catalyst 3 and the temperature of the exhaust gas flowing into the catalyst 3, or comparing the amounts of heat generation at the time of adding the reducing agent.

Figure 10:
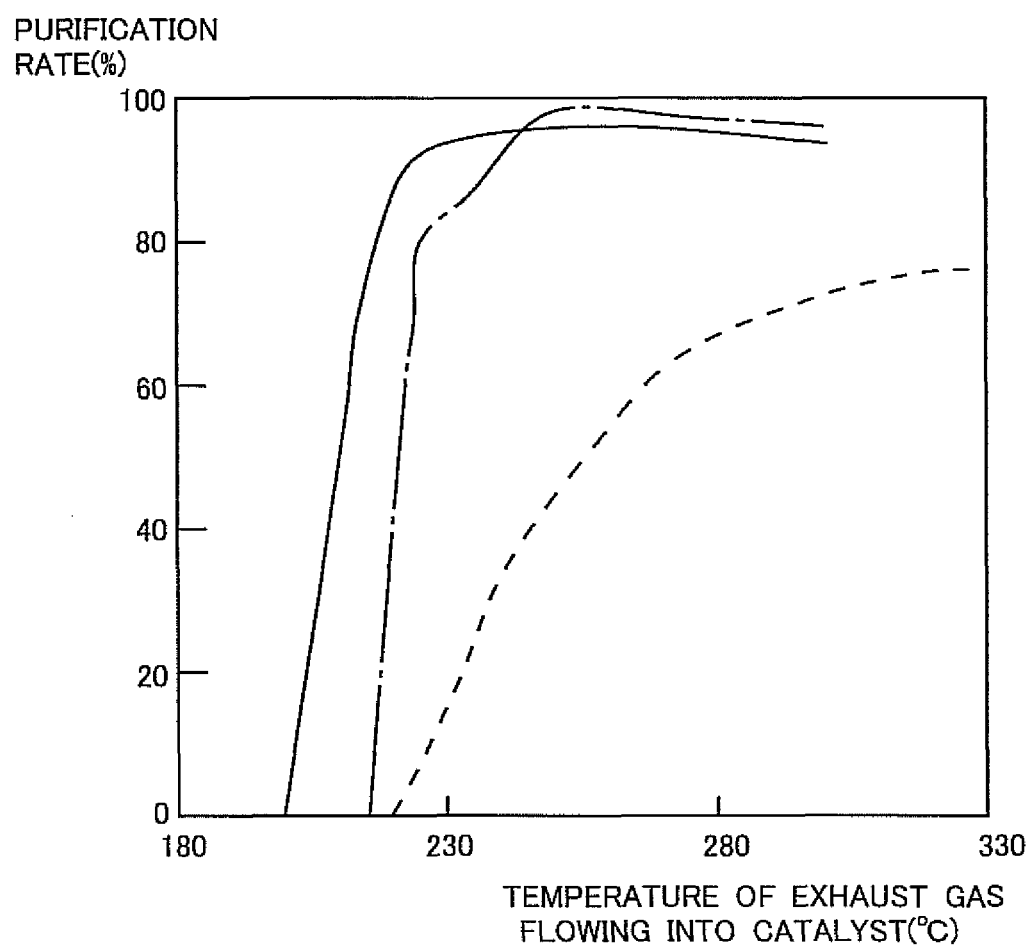
[FIG. 10] is a view showing the relation between the temperature of the exhaust gas flowing into the catalyst and the purification rate in the catalyst in a steady state operation.

Moreover, FIG. 10 is a view showing the relation between the temperature of the exhaust gas flowing into the catalyst 3 and the purification rate in the catalyst 3 in a steady state operation. The purification rate indicates the ratio of an amount of reducing agent reacting in the catalyst with respect to an amount of reducing agent flowing into the catalyst. The amount of reducing agent reacting in the catalyst may also be as a difference between the amount of reducing agent flowing into the catalyst, and the amount of reducing agent flowing out from the catalyst. These can be detected by means of sensors. As can be seen from FIG. 10, at most temperatures, the difference in the purification rate between the normal catalyst and the deteriorated catalyst is large, but the difference in the purification rate between the normal catalyst and the criterion catalyst is small. In addition, although the difference in the purification rate between the normal catalyst and the criterion catalyst becomes large at temperatures in the vicinity of 200 degree C., for example, it is difficult to maintain such temperatures during running, and the operation region in which the determination of deterioration is possible is limited.

In this manner, it is difficult to distinguish the normal catalyst and the criterion catalyst from each other only by using only the temperature of the exhaust gases at the downstream side from the catalyst 3, or the rate of heat generation of the catalyst 3, or the purification rate in the catalyst 3. On the other hand, in this embodiment, the determination of deterioration of the catalyst can be carried out by using the temperature change range at the time of transient operation. In addition, even in cases where the extent of the deterioration of the catalyst 3 is low, the determination of deterioration can be made, so it is possible to detect the deterioration of the catalyst 3 at an earlier period of time. Moreover, because the determination of deterioration can be carried out at the time of transient operation, it is possible to provide more opportunity for the determination of deterioration.

Here, note that in this embodiment, the determination of deterioration of the catalyst 3 is carried out at the time of regeneration of the filter 7, but as long as the reducing agent is added to the catalyst 3, the determination of deterioration of the catalyst 3 can also be carried out at other time. For example, the deterioration determination may also be made, even in cases where the reducing agent is added in order to raise the temperature of another catalyst which is arranged at the downstream side from the catalyst 3. In addition, the deterioration determination may also be made, even in cases where the reducing agent is added in order to recover sulfur poisoning of a NOx catalyst, or in order to reduce NOx in the exhaust gas. Moreover, in this embodiment, although the reducing agent is supplied by the addition valve 4, unburnt fuel may be caused to discharge from the combustion chambers of the internal combustion engine 1. Further, the reducing agent may be added in an intermittent manner. That is, the deterioration determination need only be made in the course of carrying out the control of adding the reducing agent. Something other than fuel can also be used for the reducing agent.

Further, in this embodiment, the determination of deterioration of the catalyst 3 is carried out based on the temperature of the exhaust gas at the downstream side from the catalyst 3, but instead of this, the determination of deterioration of the catalyst 3 may be carried out by directly detecting the temperature of the downstream side portion of the catalyst 3.

Furthermore, in this embodiment, the deterioration determination is carried out by using the minimum value of the temperature of the exhaust gas at the downstream side from the catalyst 3, but in cases where the temperature change range calculated during deceleration exceeds the threshold value, a determination may be made that the catalyst 3 has deteriorated. That is, even if the temperature of the exhaust gas at the downstream side from the catalyst 3 has not yet reached the minimum value, the deterioration determination can also be carried out in the course of temperature changing.

In addition, in this embodiment, the determination of deterioration of the catalyst 3 is carried out based on the temperature change range, but instead of this, the determination of deterioration of the catalyst 3 can also be carried out based on another correlation value which is correlated with the amount of change of the temperature detected by the downstream side temperature sensor 6. That is, the deterioration determination can also be carried out by the use of other values indicating a phenomenon that the heat generation part moves to the downstream side according to the extent of deterioration of the catalyst 3.

For example, the determination of deterioration of the catalyst 3 can be carried out based on the rate of change in the temperature of the exhaust gas at the downstream side from the catalyst 3 after having shifted from acceleration to deceleration. As stated above, at the time of deceleration, the heat of the catalyst 3 is carried away by the exhaust gas, so that the temperature of the catalyst 3 is decreased. As a result, the temperature of the exhaust gas at the downstream side from the catalyst 3 goes down. Then, the larger the extent of the deterioration of the catalyst 3, the smaller becomes the heat stored in the catalyst 3, and hence, the larger becomes the extent of temperature drop of the catalyst 3. That is, the rate of drop in the temperature of the exhaust gas at the downstream side from the catalyst 3 becomes larger in accordance with the extent of deterioration of the catalyst 3. Accordingly, for example, when the rate of drop in the temperature measured by the downstream side temperature sensor 6 is larger than a threshold value, a determination is made that the catalyst 3 has deteriorated. In the case of carrying out such a determination, in place of the processing of step S106 in the above-mentioned flow of FIG. 6, a value, which is obtained by dividing "the difference (the temperature change range) between the maximum value TMAX and the minimum value TMIN" of the temperature by "a period of time after the maximum value TMAX of the temperature is calculated until the minimum value TMIN is calculated", is used as the rate of drop of the temperature, and it is determined whether this rate of temperature drop is equal to or less than a threshold value. This threshold value has been beforehand obtained through experiments or the like as an upper limit value of a range in which the catalyst 3 is normal. In addition, an amount of drop of the temperature per unit time in an arbitrary period of time after an affirmative determination is made in step S 104 until the minimum value TMIN of the temperature is calculated in step S 105 may be calculated as the rate of temperature drop. In this case, the processing of step S103 is unnecessary. Thus, in cases where the determination of deterioration of the catalyst 3 is carried out based on the rate of drop of the temperature, the ECU 10, which calculates the rate of drop of the temperature, corresponds to the electronic control unit in the present invention. Moreover, in this embodiment, the process of calculating the rate of drop of the temperature corresponds to the first step in the present invention. Further, in this embodiment, the ECU 10, which determines whether the rate of drop of the temperature is equal to or less than the threshold value, corresponds to the electronic control unit in the present invention. Furthermore, in this embodiment, the process of determining whether the rate of drop of the temperature is equal to or less than the threshold value corresponds to the second step in the present invention.

Moreover, the determination of deterioration of the catalyst 3 may be carried out by using, as the temperature change range, a value which is obtained by subtracting, from the maximum value of the temperature of the catalyst 3 at the time of acceleration, the minimum value of the temperature of the catalyst 3 at the time of idling or deceleration before the acceleration. Here, at the time of acceleration of the internal combustion engine 1, the temperature of the exhaust gas at the downstream side from the catalyst 3 becomes higher in accordance with the progress of deterioration of the catalyst 3, as referred to above. That is, the amount of rise and the rate of rise of the temperature, which are measured by the downstream side temperature sensor 6, become higher. For this reason, for example, when the temperature change range, which is a value obtained by subtracting, from the maximum value of the temperature of the catalyst 3 at the time of acceleration, the minimum value of the temperature of the exhaust gas at the downstream side from the catalyst 3 before the start of the acceleration, is larger than a threshold value, a determination can be made that the catalyst 3 has deteriorated. In cases where such a determination is carried out, in step S103 of the above-mentioned flow in FIG. 6, the maximum value TMAX of the temperature detected by the downstream side temperature sensor 6 is calculated, and at the same time, the minimum value TMIN of the temperature detected by the downstream side temperature sensor 6 before the start of acceleration is calculated. This minimum value TMIN of the temperature may also be a temperature detected by the downstream side temperature sensor 6 at the time when an affirmative determination is made in step S102. In addition, because the minimum value TMIN of the temperature is calculated in step S103, the processing of step S105 is unnecessary. Then, in step S106, it is determined whether the difference (temperature change width or range) between the maximum value TMAX and the minimum value TMIN of the temperature is equal to or less than a threshold value. This threshold value has been obtained, in advance through experiments, etc., as an upper limit value of the temperature change range at the time when the catalyst 3 is within the normal range, and has been stored in the ECU 10.

Further, when the rate of rise of the temperature measured by the downstream side temperature sensor 6 during deceleration is larger than a threshold value, a determination may be made that the catalyst 3 has deteriorated. In cases where such a determination is carried out, in step S103 of the above-mentioned flow in FIG. 6, the maximum value TMAX of the temperature detected by the downstream side temperature sensor 6 is calculated, and at the same time, the minimum value TMIN of the temperature detected by the downstream side temperature sensor 6 before the start of acceleration is calculated. This minimum value TMIN of the temperature may also be a temperature detected by the downstream side temperature sensor 6 at the time when an affirmative determination is made in step S102. In addition, because the minimum value TMIN of the temperature is calculated in step S103, the processing of step S105 is unnecessary. Then, in place of the above-mentioned processing of step S106, a value, which is obtained by dividing "the difference (the temperature change range) between the maximum value TMAX and the minimum value TMIN" of the temperature by "a period of time after the minimum value TMIN of the temperature is calculated until the maximum value TMAX is calculated", is used as the rate of rise of the temperature, and it is determined whether this rate of temperature rise is equal to or less than a threshold value. This threshold value has been beforehand obtained through experiments or the like as an upper limit value of a range in which the catalyst 3 is normal. Also, an amount of rise of the temperature per unit time in an arbitrary period of time after an affirmative determination is made in step S102 until an affirmative determination is made in step S104 may be calculated as the rate of temperature rise. In this case, the processing of step S103 is unnecessary. Thus, in cases where the determination of deterioration of the catalyst 3 is carried out based on the rate of rise of the temperature, the ECU 10, which calculates the rate of rise of the temperature, corresponds to the electronic control unit in the present invention. Moreover, in this embodiment, the process of calculating the rate of rise of the temperature corresponds to the first step in the present invention. Further, in this embodiment, the ECU 10, which determines whether the rate of rise of the temperature is equal to or less than the threshold value, corresponds to the electronic control unit in the present invention. Furthermore, in this embodiment, the process of determining whether the rate of rise of the temperature is equal to or less than the threshold value corresponds to the second step in the present invention.

Furthermore, the rate of drop or the rate of rise in the temperature of the exhaust gas at the downstream side from the catalyst 3 may also be an amount of change of the temperature in a predetermined period of time. Because this predetermined period of time is shorter than a period of time which is taken for obtaining the maximum value and the minimum value of the temperature, it is possible to increase the opportunity for carrying out the determination of deterioration to a greater extent. In cases where the temperature rises, the amount of change of the temperature becomes a positive value, whereas in cases where the temperature drops, the amount of change of the temperature becomes a negative value. When the rate of change of the temperature detected by the downstream side temperature sensor 6 becomes out of a specified range, a determination may be made that the catalyst 3 has deteriorated. In the case of carrying out such a determination, for example, in place of the processing of step S103 in the above-mentioned flow of FIG. 6, the rate of change of the temperature during acceleration is calculated. In this case, the processing of step S105 need not be carried out. In addition, in place of the processing of step S105, the rate of change of the temperature during deceleration may be calculated. In this case, the processing of step S103 need not be carried out. Then, in place of the processing of step S106, it is determined whether the rate of change of the temperature is within a prescribed range. This prescribed range has been beforehand obtained through experiments or the like as a range of the rate of change at the time when the catalyst 3 is normal. Thus, in cases where the determination of deterioration of the catalyst 3 is carried out based on the rate of change of the temperature, the ECU 10, which calculates the rate of change of the temperature, corresponds to the electronic control unit in the present invention. Moreover, the process of calculating the rate of change of the temperature corresponds to the first step in the present invention. Further, the ECU 10, which determines whether the rate of change of the temperature is equal to or less than the threshold value, corresponds to the electronic control unit in the present invention. Furthermore, the process of determining whether the rate of change of the temperature is equal to or less than the threshold value corresponds to the second step in the present invention.

[Second Embodiment]

This second embodiment is different from the first embodiment in a prerequisite or precondition at the time of carrying out the determination of deterioration of the catalyst 3. The other devices, parts and so on are the same as those in the first embodiment, so the explanation thereof is omitted. In this second embodiment, the determination of deterioration is carried out only in cases where it is in a state where a temperature change range required for an accurate determination of deterioration takes place. That is, depending on the operating state of the internal combustion engine 1, the temperature change range may become almost the same irrespective of whether the catalyst 3 is normal or not. In such a case, an accurate determination cannot be expected even if the determination of deterioration of the catalyst 3 is carried out. Accordingly, the determination of deterioration of the catalyst 3 is carried out only in cases where a difference occurs in the temperature change range between the case where the catalyst 3 is normal, and the case where the catalyst 3 has deteriorated.

Specifically, the temperatures of the upstream side portion of the catalyst 3 at the time of shifting from acceleration to deceleration are obtained in cases where the catalyst 3 is supposed to be a normal catalyst, and in cases where the catalyst 3 is supposed to be a criterion catalyst, respectively, and when there is a sufficient difference between these temperatures, the determination of deterioration is carried out. That is, the determination of deterioration of the catalyst 3 is carried out only in an operating state in which a heat generation part moves to the downstream side in accordance with the extent of deterioration of the catalyst 3 during acceleration. Here, note that the temperature of the upstream side portion of the catalyst 3 may have been obtained in advance through experiments, etc., by using as a parameter, an operating state of the internal combustion engine 1, an ambient air temperature, etc., and then may have been formed into a map. In addition, the temperature of the catalyst 3 may be measured by means of a sensor which is mounted on the catalyst 3.

Figure 11:
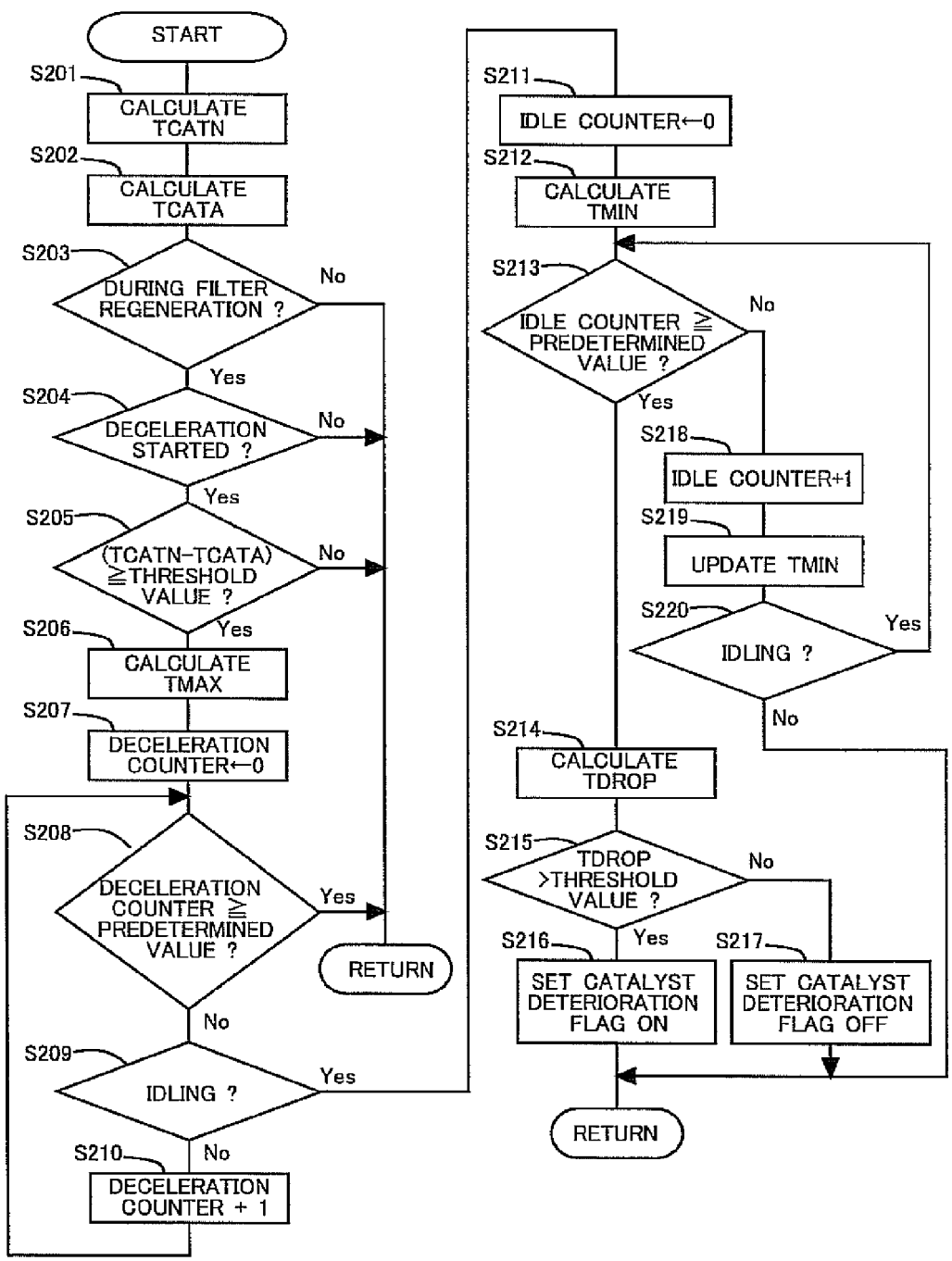
[FIG. 11] is a flow chart showing a flow for the determination of deterioration of a catalyst according to a second embodiment of the present invention.

FIG. 11 is a flow chart which shows a flow or routine for the determination of deterioration of the catalyst 3 according to this second embodiment. This routine is carried out by means of the ECU 10 at each predetermined time interval.

In step S201, the temperature TCATN of the normal catalyst is calculated. This temperature TCATN of the normal catalyst is a temperature of the upstream side portion of the catalyst 3 when it is assumed that the catalyst 3 is normal. This temperature is obtained from a map based on the operating state (e.g., the number of engine revolutions per unit time and the engine load) of the internal combustion engine 1. This map has been beforehand obtained through experiments, etc., and stored in the ECU 10.

In step S202, the temperature TCATA of the criterion catalyst is calculated. This temperature TCATA of the criterion catalyst is a temperature of the upstream side portion of the catalyst 3 when it is assumed that the catalyst 3 is in a state having just exceeded the normal range. This temperature is obtained from a map based on the operating state of the internal combustion engine 1. This map has been beforehand obtained through experiments, etc., and stored in the ECU 10.

In step S203, it is determined whether the filter 7 is in the process of regeneration. That is, it is determined whether it is in a state where the reducing agent is supplied from the addition valve 4. Here, note that it may be additionally determined whether a condition of "before acceleration" and a condition of "during acceleration" are satisfied, similar to step S102 of FIG. 6 in the first embodiment. In cases where an affirmative determination is made in step S203, the routine advances to step S204, whereas in cases where a negative determination is made, the deterioration determination of the catalyst 3 can not be made, and hence, this routine is ended.

In step S204, it is determined whether deceleration has been started. That is, it is determined whether it is in a state where the temperature of the reducing agent 3 can drop. For example, in cases where an amount of depression of the accelerator pedal 11 obtained by the accelerator opening sensor 12 is equal to or less than a specified value, a determination is made that deceleration has been started. In cases where an affirmative determination is made in step S204, the routine advances to step S205, whereas in cases where a negative determination is made, the deterioration determination of the catalyst 3 can not still be made, and hence, this routine is ended. Here, note that in cases where a negative determination is made in step S204, it may be determined whether it is within the effective period, similar to step S109 of FIG. 6 in the first embodiment.

In step S205, it is determined whether the difference between the temperature TCATN of the normal catalyst estimated in step S201 and the temperature TCATA of the criterion catalyst estimated in step S202 is equal to or larger than a threshold value. As stated above, when the internal combustion engine 1 is in an operating state in which the heat generation part in the catalyst 3 moves due to the deterioration thereof during acceleration, the temperature of the upstream side portion of the catalyst 3 becomes higher in the normal catalyst than in the criterion catalyst. That is, in this step, if the catalyst 3 has deteriorated, it is determined whether the catalyst deterioration is in a state to appear as a resultant temperature change range. The threshold value has been beforehand obtained through experiments or the like as a temperature difference which can determine the deterioration of the catalyst 3. Then, in cases where an affirmative determination is made in step S205, the routine advances to step S206, whereas in cases where a negative determination is made, there is a fear that accuracy in the deterioration determination of the catalyst 3 may become lower, and hence, this routine is ended, without carrying out the deterioration determination. In other words, the determination of deterioration of the catalyst 3 is carried out only in cases where a difference in the temperature change range occurs between the normal catalyst and the criterion catalyst.

In step S206, the temperature detected by the downstream side temperature sensor 6 is set as the maximum value TMAX of the temperature. That is, the temperature immediately after deceleration has been started is set as the maximum value.

In step S207, a deceleration counter is set to 0. The deceleration counter is a counter for measuring a decelerating period.

In step S208, it is determined whether the deceleration counter is equal to or more than a predetermined value. The predetermined value referred to herein is a lower limit value of a range in which the determination of deterioration of the catalyst 3 can not be carried out. That is, if a deceleration period becomes long, the temperature of the catalyst 3 will become low, irrespective of whether the catalyst 3 is normal or not, so the accuracy in the determination of deterioration of the catalyst 3 will decrease. In such a case, the deterioration determination is stopped. Here, note that in this embodiment, the deterioration determination is carried out based on the temperature during idle operation after deceleration, and hence, the deterioration determination based on the temperature during deceleration is not carried out. For this reason, when an idle state becomes long, the deterioration determination becomes unable to be carried out.

In addition, in this step, for example, a value, which is obtained by multiplying the amount of exhaust gas passing through the catalyst 3 by the temperature of the exhaust gas flowing out of the catalyst 3, is integrated, and it may be determined whether this integrated value has exceeded a specified value. The amount of exhaust gas has a correlation with the amount of intake air, and hence, the determination may be made by the use of the amount of intake air in place of the amount of exhaust gas. In addition, it may be determined whether an integrated value of the amount of energy flowing out from the catalyst 3 has exceeded a predetermined value. Moreover, for example, the amount of intake air sucked into the internal combustion engine 1 is integrated from the start of deceleration, and it may be determined whether this integrated value has exceeded a specified value. That is, such a determination need only be made by the use of a parameter which has a correlation with the extent of the drop of the temperature of the catalyst 3. Then, if such a determination is made by the use of the deceleration counter, it will become possible to carry out a simple determination. Here, note that the same determination as that in this step may be carried out during deceleration in the first embodiment (e.g., between step S104 and step S105 in FIG. 6).

In cases where an affirmative determination is made in step S208, the deterioration determination of the catalyst 3 cannot be made, and hence, this routine is ended. On the other hand, in cases where a negative determination is made in step S208, the routine advances to step S209.

In step S209, it is determined whether the internal combustion engine 1 is during an idle operation. That is, it is determined whether it is in a state where the determination of deterioration of the reducing agent 3 can be made. In cases where an affirmative determination is made in step S209, the routine advances to step S211, whereas in cases where a negative determination is made, the routine advances to step S210.

In step S210, 1 is added to the deceleration counter. That is, the deceleration counter increases until the internal combustion engine 1 shifts to idle operation.

In step S211, an idle counter is set to 0. The idle counter is a counter for measuring a period of time in which the idle state continues.

In step S212, the temperature detected by the downstream side temperature sensor 6 is set as the minimum value TMIN of the temperature. An initial value of the minimum value TMIN is a temperature immediately after idle operation has been started.

In step S213, it is determined whether the idle counter is equal to or more than a predetermined value. In this step, it is determined whether the temperature of the exhaust gas flowing out of the catalyst 3 is in a sufficiently lowered state. The predetermined value referred to herein is a lower limit value of a range in which the determination of deterioration of the catalyst 3 can be carried out. This predetermined value is set as a value which can obtain the minimum value of the temperature of the exhaust gas flowing out of the catalyst 3. Here, note that if the period of time of the idle operation becomes long, the temperature of the normal catalyst will also drop, so it will become difficult to carry out the deterioration determination. Accordingly, the predetermined value is decided by taking this into consideration, too. In cases where an affirmative determination is made in step S213, the routine advances to step S214, whereas in cases where a negative determination is made, the routine advances to step S218.

In step S214, a temperature change width or range TDROP, which is a difference between the maximum value TMAX and the minimum value TMIN of the temperature, is calculated. Here, note that in this embodiment, the ECU 10, which carries out the processing of step S214, corresponds to the electronic control unit in the present invention. Also, in this embodiment, the step S214 corresponds to the first step in the present invention.

In step 5215, it is determined whether the temperature change range TDROP is larger than a threshold value. This threshold value has been obtained, in advance through experiments, etc., as an upper limit value at the time when the catalyst 3 is normal, and has been stored in the ECU 10. Here, note that in this embodiment, the ECU 10, which carries out the processing of step 5215, corresponds to the electronic control unit in the present invention. Also, in this embodiment, the step 5215 corresponds to the second step in the present invention.

In cases where an affirmative determination is made in step S215, the routine advances to step S216, in which a catalyst deterioration flag is set to on. On the other hand, in cases where a negative determination is made in step S215, the routine advances to step S217, in which the catalyst deterioration flag is set to off. Here, note that the catalyst deterioration flag is a flag which indicates whether the catalyst 3 is normal or has deteriorated, wherein the catalyst deterioration flag becomes off when the catalyst 3 is normal, whereas the catalyst deterioration flag becomes on when the catalyst 3 has deteriorated.

In addition, in step S218, 1 is added to the idle counter. That is, the idle counter increases during the time when the idle operation continues.

In step S219, the temperature detected by the downstream side temperature sensor 6 is updated as the minimum value TMIN of the temperature. That is, when the idle operation continues, the temperature of the exhaust gas flowing out of the catalyst 3 drops in a gradual manner, and so, the minimum value TMIN is updated. Here, note that the update is not carried out in cases where the temperature detected by the downstream side temperature sensor 6 is higher than the minimum value TMIN of the temperature which has already been set.

In step S220, it is determined whether the idle operation is during continuation. In cases where an affirmative determination is made in step S220, the routine returns to step S213, whereas in cases where a negative determination is made, accuracy in the deterioration determination of the catalyst 3 is low, and hence, this routine is ended, without carrying out the deterioration determination.

Thus, the determination of deterioration of the catalyst 3 can be carried out based on the temperature change width or range TDROP. Here, note that in this embodiment, the deterioration determination is carried out based on the minimum value of the temperature of the exhaust gas flowing out of the catalyst 3 after the internal combustion engine 1 has shifted to idle operation, but the deterioration determination may be carried out based on the minimum value of the temperature of the exhaust gas flowing out of the catalyst 3 during deceleration before the internal combustion engine 1 shifts to idle operation. A temperature detected by the downstream side temperature sensor 6 at the time when the deceleration counter becomes a specified value may be used as the minimum value TMIN. In addition, in place of the control after step S205, control in step S103 and thereafter in FIG. 6 of the first embodiment may be carried out.

Here, note that in this embodiment, the determination of deterioration of the catalyst 3 is carried out based on the temperature change range TDROP which is the difference between the maximum value TMAX of the temperature at the time of acceleration and the minimum value TMIN thereof at the time of subsequent idling, but instead of this, the determination of deterioration of the catalyst 3 may be carried out based on the rate of drop of the temperature. In addition, the determination of deterioration of the catalyst 3 may be carried out based on the rate of rise or the amount of rise of the temperature measured by the downstream side temperature sensor 6 during acceleration. These can be determined, similarly as in the first embodiment.

[Third Embodiment]

This third embodiment is different from the first and second embodiments in that the determination of deterioration of the catalyst 3 is carried out, and at the same time, the determination of abnormality of the addition valve 4 is carried out as well. The other devices, parts and so on are the same as those in the first embodiment, so the explanation thereof is omitted. Here, note that in this embodiment, an abnormality is detected in which an amount of reducing agent added from the addition valve 4 becomes smaller than a target value (command value).

Here, at the time of steady state operation, in cases where the catalyst 3 has deteriorated or the amount of reducing agent added from the addition valve 4 decreases, the amount of heat generation in the catalyst 3 decreases. For this reason, in the case of using only the amount of heat generation, it has been impossible to distinguish whether the catalyst 3 has deteriorated or the amount of reducing agent has decreased. In the past, this has been distinguished by the addition of hardware. On the other hand, in this embodiment 3, by the use of the temperature change range, it is distinguished which of the abnormalities has occurred.

Figure 12:
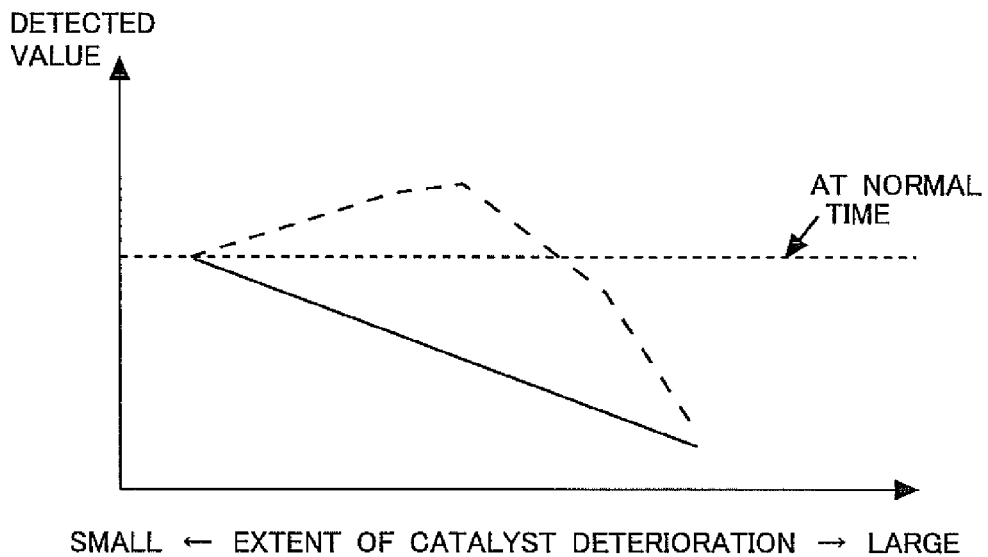
[FIG. 12] is a view showing the relation between the extent of deterioration of the catalyst and detection parameters.

FIG. 12 is a view showing the relation between the extent of deterioration of the catalyst 3 and detection parameters. A solid line indicates the total amount of the amounts of heat generation in the catalyst 3 in a prescribed period of time. This may also be an integrated value of the difference between the temperature obtained by the downstream side temperature sensor 6, and the temperature obtained by the upstream side temperature sensor 5. This total amount of the amounts of heat generation will be described later. In addition, a broken line indicates the difference (the temperature change range) between the maximum value of the temperature of the catalyst 3 at the time of acceleration, and the minimum value of the temperature of the catalyst 3 at the time of deceleration or idling. This temperature change range is a value which is obtained in the first or second embodiment. The term "at normal time" indicates the detected value when the catalyst 3 and the addition valve 4 are normal.

The total amount of the amounts of heat generation becomes smaller as the deterioration of the catalyst 3 progresses. That is, according to the progress of the deterioration of the catalyst 3, the heat generation part in the catalyst 3 moves to the downstream side, so that the amount of heat generation in the upstream side from the catalyst 3 decreases, and at the same time, an amount of the reducing agent passing sideways through the catalyst 3 increases. As a result, the amount of heat generation of the catalyst 3 as a whole decreases. On the other hand, when the extent of the deterioration of the catalyst 3 is low, the temperature change range becomes larger in accordance with the progress of the deterioration of the catalyst 3, as described in the first embodiment. However, as the deterioration of the catalyst 3 further progresses, the amount of reaction of the reducing agent decreases in the downstream side portion of the catalyst 3, too, so that the temperature of the exhaust gas flowing out from the catalyst 3 also goes down. For this reason, when the degree of deterioration of the catalyst 3 exceeds a certain value, the temperature change range becomes smaller in accordance with the progress of the deterioration of the catalyst 3. Thus, according to the extent of the deterioration of the catalyst 3, the total amount of the amounts of heat generation only goes down or decreases, but the temperature change range once goes up.

Figure 13:
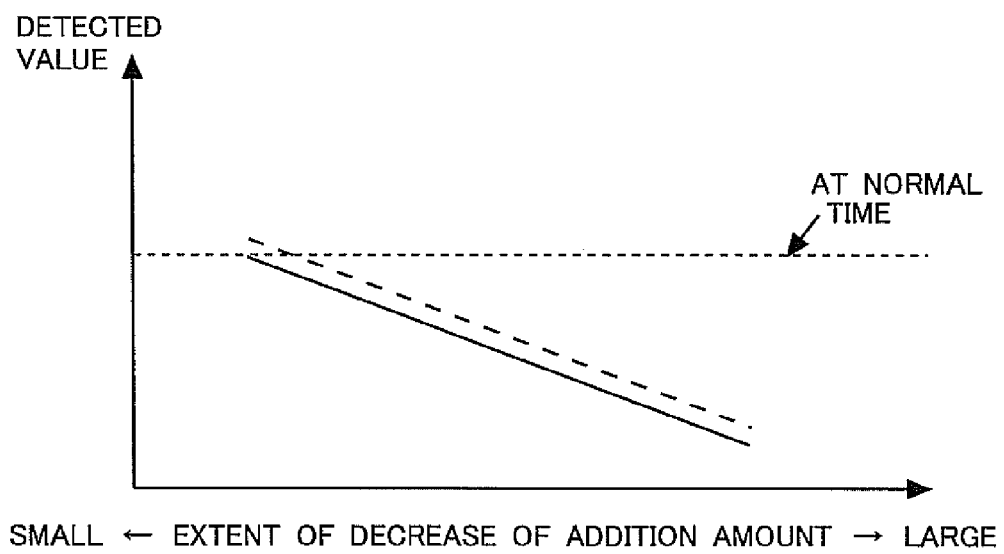
[FIG. 13] is a view showing the relation between the extent of decrease in the amount of a reducing agent added from an addition valve and the detection parameters.

In addition, FIG. 13 is a view showing the relation between the extent of decrease in the amount of the reducing agent added from the addition valve 4 and the detection parameters. The solid line and the broken line are used with the same meaning as in FIG. 12. The term "at normal time" indicates the detected value when the catalyst 3 and the addition valve 4 are normal.

The total amount of the amounts of heat generation becomes smaller as the extent of decrease in the amount of reducing agent becomes larger. That is, as the extent of decrease in the amount of reducing agent becomes larger, the amount of reducing agent added to the catalyst 3 becomes smaller, so that the amount of heat generation of the catalyst 3 as a whole decreases. In addition, the temperature change range also becomes smaller as the extent of decrease in the amount of reducing agent becomes larger. That is, the amount of heat generation in the downstream side portion of the catalyst 3 decreases, so the temperature of the exhaust gas flowing out of the catalyst 3 also becomes lower. Thus, the total amount of the amounts of heat generation and the temperature change range go down or decrease in accordance with the extent of decrease in the amount of reducing agent.

Then, in cases where the catalyst 3 has deteriorated, the modes of the change over time of the total amount of the amounts of heat generation and the temperature change range are different from each other, and hence, the determination of deterioration of the catalyst 3 can be carried out based on the total amount of the amounts of heat generation and the temperature change range. In addition, when the extent of the deterioration of the catalyst 3 is known, it will be found that how much the amounts of heat generation change due to the influence of the extent of the deterioration of the catalyst 3. Then, by taking into consideration a decreased part of the amounts of heat generation due to this extent of the deterioration of the catalyst 3, the extent of decrease in the reducing agent is also known from the amounts of heat generation. Here, note that the total amount of the amounts of heat generation is calculated as follows.

Figure 14:
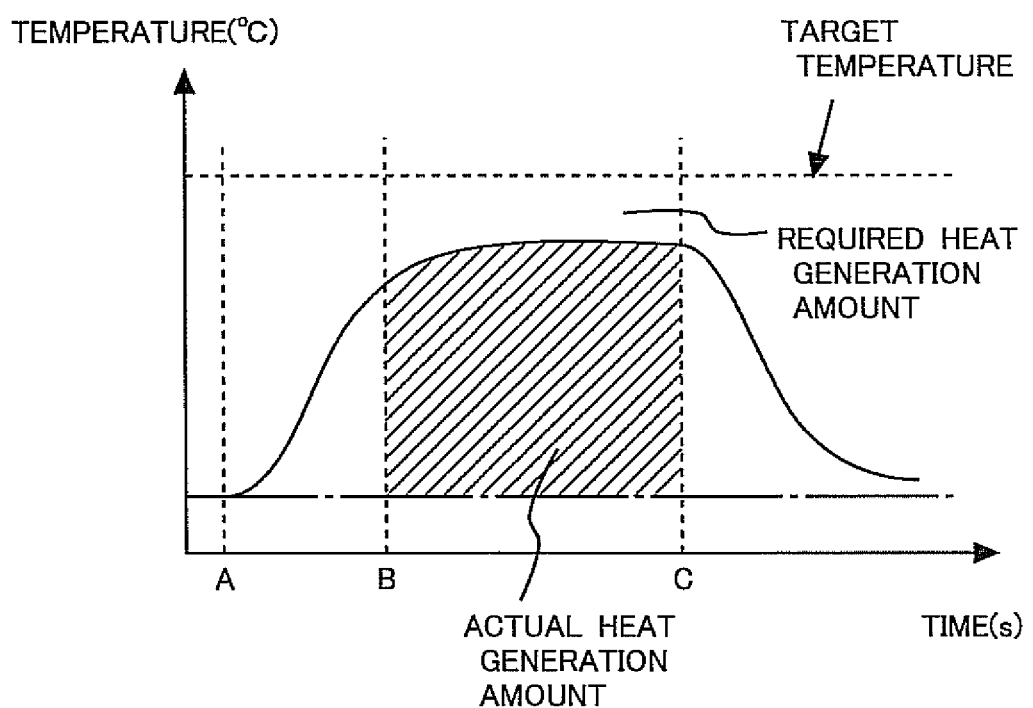
[FIG. 14] is a view showing the relation between the change over time of the temperature of an exhaust gas, and the total amount of the amounts of heat generation.

FIG. 14 is a view showing the relation between the change over time of the temperature of the exhaust gas, and the total amount of the amounts of heat generation. A solid line indicates the temperature of the exhaust gas at the downstream side from the catalyst 3 obtained by the downstream side temperature sensor 6. Also, an alternate long and short dash line indicates the temperature of the exhaust gas at the upstream side from the catalyst 3 obtained by the upstream side temperature sensor 5. A time point indicated at A is a time point at which the regeneration of the filter 7 is started, and this is a time point at which the addition of the reducing agent from the addition valve 4 is started. A time point indicated at B is a time point at which the calculation of the total amount of the amounts of heat generation is started, and this is a time point at which the temperature obtained by the downstream side temperature sensor 6 reaches some certain temperature. An optimal value for this time point B may also be obtained through experiments, etc. A time point indicated at C is a time point at which the regeneration of the filter 7 is ended, and this is a time point at which the addition of the reducing agent from the addition valve 4 is ended. In addition, the time point indicated at C is also a time point at which the calculation of the total amount of the amounts of heat generation is ended.

That is, in order to regenerate the filter 7 in a period of time from time point A to time point C, the reducing agent is added from the addition valve 4. In addition, the total amount of the amounts of heat generation in a period of time from time point B to time point C is calculated. The total amount of the amounts of heat generation is obtained by integrating, over the period of time from time point B to time point C, a value which is obtained by subtracting the temperature of the exhaust gas obtained by the upstream side temperature sensor 5 from the temperature of the exhaust gas obtained by the downstream side temperature sensor 6. The total amount of the amounts of heat generation is an area of a hatched or shaded portion, and represents an actual amount of heat generation. Moreover, a target temperature in FIG. 14 is a target value of the temperature of the exhaust gas at the downstream side from the catalyst 3 at the time of the supply of the reducing agent, and is a temperature which is able to go up in the case of the normal catalyst. Then, the total amount of the amounts of heat generation in the period of time from time point B to time point C when it is assumed that the temperature of the exhaust gas at the downstream side from the catalyst 3 has gone up to the target temperature is represented as a required amount of heat generation. Here, note that the period of time from time point B to time point C is a sufficiently long period of time, as compared with the period of time in which the temperature change range is obtained.

The deterioration of the catalyst 3 and the decrease of the amount of reducing agent are distinguished from each other based on the total amount of the amounts of heat generation obtained in this manner and the temperature change range obtained in the first or second embodiment. First, the extent of the deterioration of the catalyst 3 is determined based on the temperature change range which shows different tendencies between the deterioration of the catalyst 3 and the decrease of the amount of reducing agent.

Figure 15:
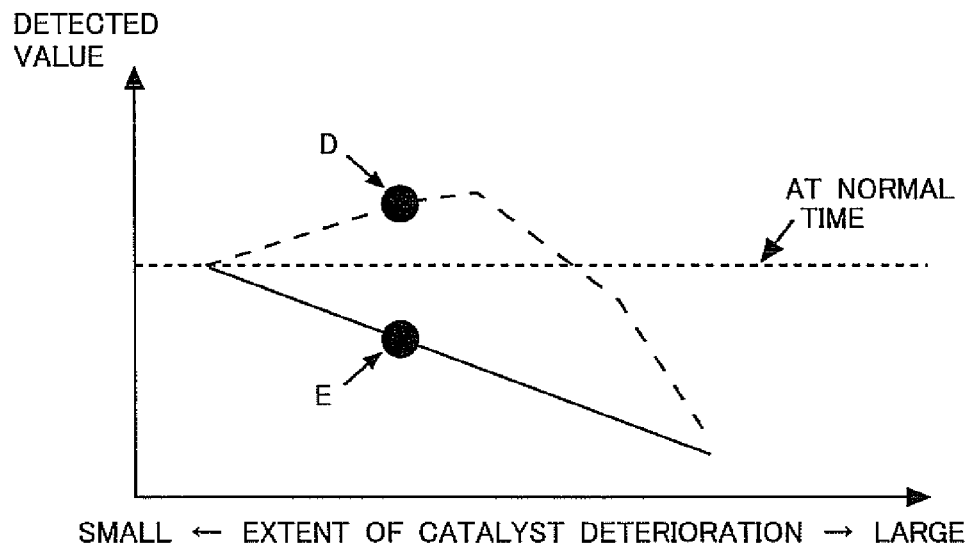
[FIG. 15] is a view showing the relation between the extent of deterioration of the catalyst and the detection parameters.

FIG. 15 is a view showing the relation between the extent of deterioration of the catalyst 3 and detection parameters. A solid line and a broken line are used with the same meaning as in FIG. 12. The term "at normal time" indicates the detected value when the catalyst 3 and the addition valve 4 are normal. This relation has beforehand been obtained through experiments, etc. The extent of the deterioration of the catalyst can be obtained by assigning an actual temperature change range to this FIG. 15 (see D in FIG. 15). Then, it is possible to carry out the determination of deterioration of the catalyst 3 according to this extent of the deterioration thus obtained. In addition, this extent of the deterioration also affects the total amount of the amounts of heat generation. At the time of obtaining the extent of decrease in the reducing agent, this extent of the deterioration of the catalyst 3 is taken into consideration. That is, the total amount of the amounts of heat generation in the case of absence of abnormality in the addition valve 4 is estimated based on the extent of the deterioration of the catalyst 3, (see E in FIG. 15). The relation between the extent of the deterioration of the catalyst 3 and the decreased part of the total amount of the amounts of heat generation is obtained in advance through experiments, etc. The abnormality of the addition valve 4 is determined based on the total amount of the amounts of heat generation estimated in this manner.

Figure 16:
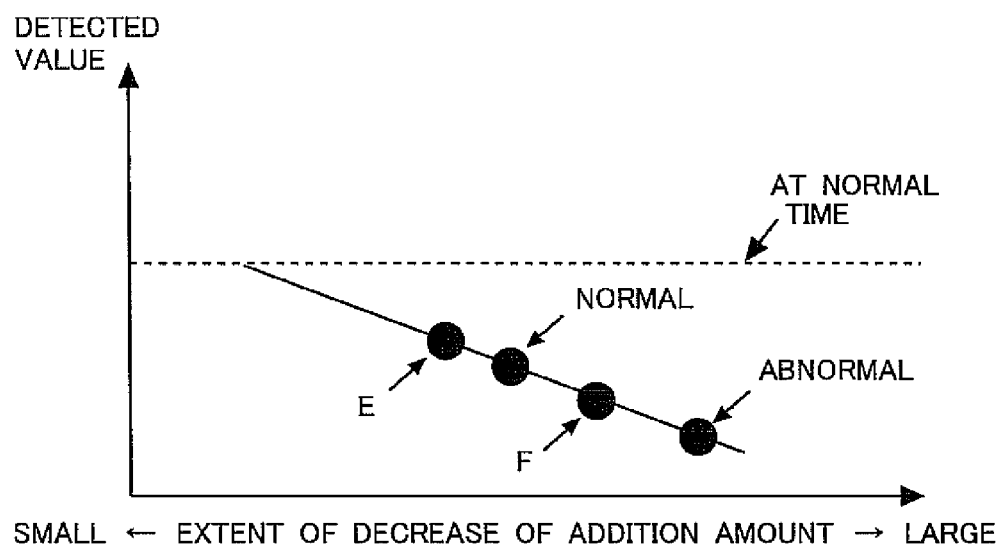
[FIG. 16] is a view showing the relation between the extent of decrease in the amount of the reducing agent added from the addition valve and the total amount of the amounts of heat generation.

Next, FIG. 16 is a view showing the relation between the extent of decrease in the amount of the reducing agent added from the addition valve 4 and the total amount of the amounts of heat generation. The term "at normal time" indicates the detected value when the catalyst 3 and the addition valve 4 are normal. A point indicated at E in FIG. 16 is the same value as a point indicated at E in FIG. 15. That is, it is a value in consideration of the decreased part of the total amount of the amounts of heat generation due to the deterioration of the catalyst 3. Based on this point indicated at E, a threshold value for the range in which it can be said that the addition valve 4 is normal is obtained. For example, the threshold value is obtained by multiplying the extent of the decrease of the reducing agent indicated at E by a specified value. This threshold value is indicated at F in FIG. 16. Then, when the extent of the decrease of the reducing agent is larger than this point indicated at F, a determination is made that the addition valve 4 is abnormal, whereas when the extent of the decrease of the reducing agent is smaller than the point F, a determination is made that the addition valve 4 is normal.

Figure 17:
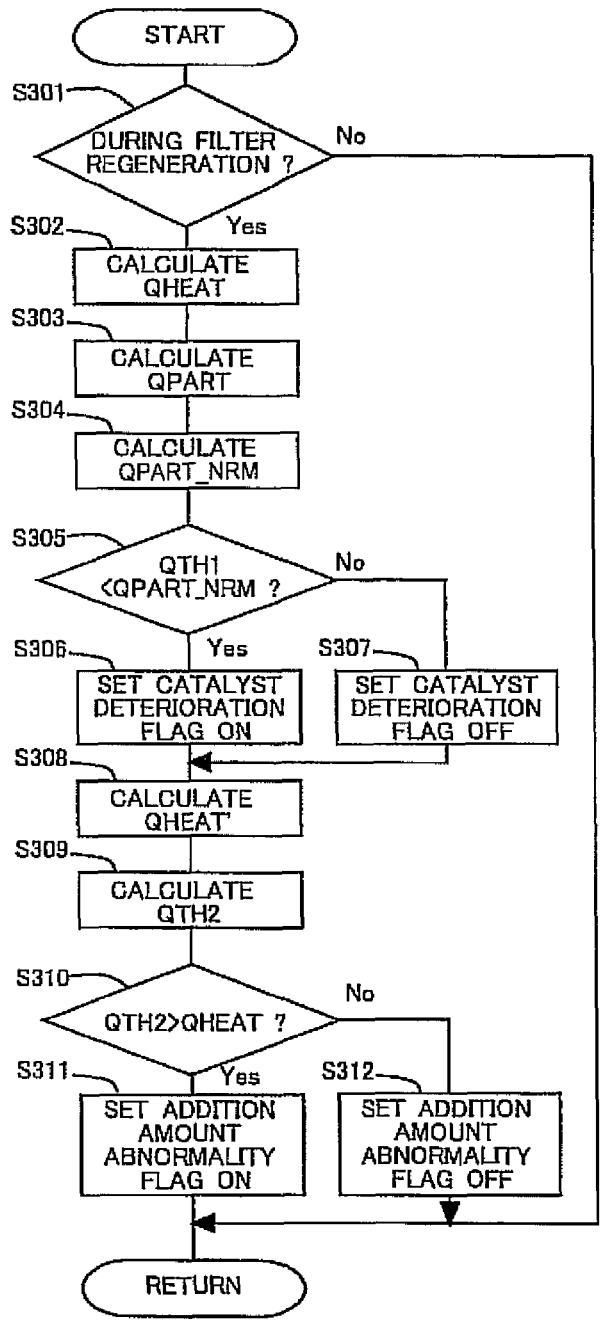
[FIG. 17] is a flow chart showing a flow for the determination of deterioration of the catalyst and the addition valve according to a third embodiment of the present invention.

Then, FIG. 17 is a flow chart which shows a flow or routine for the determination of deterioration of the catalyst 3 and the addition valve 4 according to this third embodiment. This routine is carried out by means of the ECU 10 at each predetermined time interval.

In step S301, it is determined whether the filter 7 is in the process of regeneration. That is, it is determined whether it is in a state where the reducing agent is supplied from the addition valve 4. In cases where an affirmative determination is made in step S301, the routine advances to step S302, whereas in cases where a negative determination is made, the deterioration determination of the catalyst 3 can not be made, and hence, this routine is ended.

In step S302, a total amount of the amounts of heat generation QHEAT is calculated. That is, the difference between the temperature obtained from the downstream side temperature sensor 6 and the temperature obtained from the upstream side temperature sensor 5 in the period of time from B to C in FIG. 14 is integrated. In this case, it may also be an integrated value of a value obtained by subtracting the temperature obtained by the upstream side temperature sensor 5 from the temperature obtained by the downstream side temperature sensor 6. Here, note that in this embodiment, the ECU 10, which carries out the processing of step S302, corresponds to the electronic control unit in the present invention. Also, in this embodiment, the step S302 corresponds to a third step in the present invention.

In step S303, a temperature change range QPART is calculated. This is for example, (TMAX−TMIN) in step S106 of FIG. 6.

In step S304, the temperature change range QPART is normalized. This temperature change range thus normalized is represented as QPRT_NRM. The thus normalized temperature change range QPRT_NRM is calculated by the following expression.

$$QPRT\_NRM = QPART \times (\text{reference value}/QHEAT)$$

Note that the reference value is the total amount of the amounts of heat generation QHEAT at the normal time, and has been obtained in advance through experiments, etc.

In step S305, it is determined whether the temperature change range QPRT_NRM is larger than a threshold value QTH1. This threshold value QTH1 is an upper limit value of a range in which the catalyst 3 is normal, and has been beforehand obtained through experiments or the like. In cases where an affirmative determination is made in step S305, the routine advances to step S306, whereas in cases where a negative determination is made, the routine advances to step S307.

In step S306, a catalyst deterioration flag is set to on. In step S307, the catalyst deterioration flag is set to off. Here, note that the catalyst deterioration flag is a flag which indicates whether the catalyst 3 is normal or has deteriorated, wherein the catalyst deterioration flag becomes off when the catalyst 3 is normal, whereas the catalyst deterioration flag becomes on when the catalyst 3 has deteriorated.

In step S308, a total amount of the amounts of heat generation QHEAT' is calculated from the temperature change range QPRT_NRM. That is, the total amount of the amounts of heat generation when it is assumed that the addition valve 4 is normal is calculated based on the extent of the deterioration of the catalyst 3 (see E in FIG. 16). An expression, which serves to convert the temperature change range QPRT_NRM into the total amount of the amounts of heat generation QHEAT', has been set in advance. In addition, a map for obtaining the total amount of the amounts of heat generation QHEAT' from the temperature change range QPRT_NRM may have been obtained through experiments, etc., and may have been stored in the ECU 10. In this embodiment, the ECU 10, which carries out the processing of step S308, corresponds to the electronic control unit in the present invention. Also, in this embodiment, the step S308 corresponds to a fourth step in the present invention.

In step S309, a threshold value QTH2 for determining whether the addition valve 4 is abnormal is calculated. The threshold value QTH2 is a lower limit value of the total amount of the amounts of heat generation in a range in which the addition valve 4 is normal. This is calculated by multiplying the total amount of the amounts of heat generation QHEAT' by a specified value. This specified value is a value which changes according to how much decrease of the amount of addition is determined to be abnormal.

In step S310, it is determined whether the total amount of the amounts of heat generation QHEAT is smaller than the threshold value QTH2. In cases where an affirmative determination is made in step S310, the routine advances to step S311, whereas in cases where a negative determination is made, the routine advances to step S312. In this embodiment, the ECU 10, which carries out the processing of step S310, corresponds to electronic control unit in the present invention. That is, it can be said that in this step, it is determined whether the total amount of the amounts of heat generation calculated by the electronic control unit is out of a predetermined range of the total amount of the amounts of heat generation estimated by the electronic control unit. In this embodiment, the step S310 corresponds to a fifth step in the present invention.

In step S311, an addition amount abnormality flag is set to on. In step S312, the addition amount abnormality flag is set to off. Here, note that the addition amount abnormality flag is a flag which indicates whether the amount of addition of the reducing agent from the addition valve 4 is normal or has deteriorated, wherein the addition amount abnormality flag becomes off when the amount of addition is normal, whereas the addition amount abnormality flag becomes on when the amount of addition is abnormal.

As described above, according to this embodiment, it is possible to distinguish the deterioration of the catalyst 3 and the decrease of the amount of addition of the reducing agent from the addition valve 4 from each other.

EXPLANATION OF REFERENCE NUMERALS AND CHARACTERS 1 internal combustion engine
2 exhaust passage
3 catalyst
4 addition valve
5 upstream side temperature sensor
6 downstream side temperature sensor
7 filter
8 intake passage
9 air flow meter
10 ECU
11 accelerator pedal
12 accelerator opening sensor
13 crank position sensor

The invention claimed is:

1. A catalyst deterioration detection apparatus for an internal combustion engine comprising:
 a catalyst that is arranged in an exhaust passage of the internal combustion engine and has an oxidation function;
 downstream side temperature sensor that detects a temperature of an exhaust gas at a downstream side from said catalyst; and
 addition unit that adds a reducing agent into the exhaust gas from an upstream side from said catalyst;
 comprising:
 an electronic control unit that includes program logic which, calculates a range of drop of a temperature detected by said downstream side temperature sensor during deceleration of said internal combustion engine or a range of rise of a temperature detected by said downstream side temperature sensor during acceleration of said internal combustion engine, when the reducing agent is added by said addition unit; and
 determines a deterioration of said catalyst by making a comparison between said range of temperature drop or said range of temperature rise and a threshold value which indicates the deterioration of said catalyst.

2. The catalyst deterioration detection apparatus for an internal combustion engine as set forth in claim 1,
 wherein said range of drop is a difference between a maximum value of a temperature detected by said downstream side temperature sensor during acceleration, and a temperature detected by said downstream side temperature sensor during deceleration when the acceleration has been shifted to deceleration, and said electronic control unit makes a determination that said catalyst has deteriorated, when this difference becomes larger than the threshold value.

3. The catalyst deterioration detection apparatus for an internal combustion engine as set forth in claim 1,
 wherein said range of rise is a difference between a maximum value of a temperature detected by said downstream side temperature sensor during acceleration, and a temperature detected by said downstream side temperature sensor at the time of the start of the acceleration, and said electronic control unit makes a determination that said catalyst has deteriorated, when this difference becomes larger than the threshold value.

4. The catalyst deterioration detection apparatus for an internal combustion engine as set forth in claim 1,
 wherein said electronic control unit makes a determination at the time when a period of time in which said internal combustion engine is decelerated after acceleration thereof is within a prescribed period of time which is decided based on an amount of intake air in said internal combustion engine.

5. The catalyst deterioration detection apparatus for an internal combustion engine as set forth in claim 1, wherein said electronic control unit makes a determination at the time when a period of time in which said internal combustion engine is accelerated is within a prescribed period of time which is decided based on an amount of intake air in said internal combustion engine.

6. The catalyst deterioration detection apparatus for an internal combustion engine as set forth in claim 1,
wherein said electronic control unit
estimates a temperature of said catalyst when it is assumed that there is no deterioration in said catalyst; and
estimates a temperature of said catalyst when it is assumed that said catalyst has deteriorated;
wherein said electronic control unit makes a determination, when a difference between the temperature of said catalyst when it is assumed that said catalyst has deteriorated and the temperature of said catalyst when it is assumed that there is no deterioration in said catalyst, at the time of the end of acceleration, is equal to or larger than a threshold value.

7. The catalyst deterioration detection apparatus for an internal combustion engine as set forth in claim 1,
wherein said electronic control unit makes a determination only at the time when an idle operation has been carried out immediately before the acceleration of said internal combustion engine.

8. The catalyst deterioration detection apparatus for an internal combustion engine as set forth in claim 1,
said electronic control unit makes a determination only at the time when an amount of intake air in said internal combustion engine and a temperature of the exhaust gas flowing into said catalyst, during acceleration of said internal combustion engine, are within prescribed ranges, respectively.

9. The catalyst deterioration detection apparatus for an internal combustion engine as set forth in claim 1, further comprising:
upstream side temperature sensor that detects a temperature of the exhaust gas at an upstream side from said catalyst;
wherein said electronic control unit
calculates a total amount of the amounts of heat generation in said catalyst at the time of the addition of the reducing agent, from a difference between the temperature detected by said downstream side temperature sensor and the temperature detected by said upstream side temperature sensor;
estimates a total amount of the amounts of heat generation in said catalyst at the time of the addition of the reducing agent when it is assumed that said addition unit is normal, based on a determined extent of the deterioration of said catalyst; and
determines said addition unit to be normal, in cases where the calculated total amount of the amounts of heat generation is within a predetermined range of the estimated total amount of the amounts of heat generation, but determines said addition unit to be abnormal, in cases where the calculated total amount of the amounts of heat generation is out of the predetermined range of the estimated total amount of the amounts of heat generation.

10. A catalyst deterioration detection method for an internal combustion engine, wherein
a first step to calculate a range of drop of a temperature of an exhaust gas at a downstream side from a catalyst during deceleration of said internal combustion engine or a range of rise of a temperature of the exhaust gas at the downstream side from said catalyst during acceleration of said internal combustion engine, during the time when a reducing agent is added into the exhaust gas from an upstream side from said catalyst which has an oxidation function and is arranged in the exhaust passage of the internal combustion engine; and
a second step to determine a deterioration of said catalyst by comparing said range of drop or said range of rise with a threshold value which indicates the deterioration of said catalyst.

11. The catalyst deterioration detection method for an internal combustion engine as set forth in claim 10,
wherein said range of drop is calculated as a difference between a maximum value of a temperature of the exhaust gas at the downstream side from the catalyst during acceleration, and a temperature of the exhaust gas at the downstream side from the catalyst during deceleration when the acceleration has been shifted to deceleration, and in said second step, a determination is made that said catalyst has deteriorated, when this difference becomes larger than the threshold value.

12. The catalyst deterioration detection method for an internal combustion engine as set forth in claim 10,
wherein said range of rise is calculated as a difference between a maximum value of a temperature of the exhaust gas at the downstream side from the catalyst during acceleration, and a temperature of the exhaust gas at the downstream side from the catalyst at the time of the start of the acceleration, and in said second step, a determination is made that said catalyst has deteriorated, when this difference becomes larger than the threshold value.

13. The catalyst deterioration detection method for an internal combustion engine as set forth in claim 10,
wherein in said second step, a determination is made at the time when a period of time in which said internal combustion engine is decelerated after acceleration thereof is within a prescribed period of time which is decided based on an amount of intake air in said internal combustion engine.

14. The catalyst deterioration detection method for an internal combustion engine as set forth in claim 10, wherein
a third step to calculate a total amount of the amounts of heat generation in said catalyst at the time of the addition of the reducing agent, from a difference between a temperature of the exhaust gas at the downstream side from said catalyst and a temperature of the exhaust gas at the upstream side from said catalyst;
a fourth step to estimate a total amount of the amounts of heat generation in said catalyst at the time of the addition of the reducing agent when it is assumed that an amount of addition of the reducing agent is normal, based on an extent of the deterioration of said catalyst determined by said second step; and
a fifth step to determine the amount of addition of the reducing agent to be normal, in cases where the total amount of the amounts of heat generation calculated by said third step is within a predetermined range of the total amount of the amounts of heat generation estimated by said fourth step, but to determine the amount of addition of the reducing agent to be abnormal, in cases where the total amount of the amounts of heat generation calculated by said third step is out of the predetermined range of the total amount of the amounts of heat generation estimated by said fourth step.

* * * * *